United States Patent
Li et al.

(10) Patent No.: US 12,517,897 B2
(45) Date of Patent: *Jan. 6, 2026

(54) EXTENDED TELEMETRY METRIC DATA TYPES

(71) Applicant: Snowflake Inc., Bozeman, MT (US)

(72) Inventors: Qinye Li, Redwood City, CA (US); Steven Parkes, Palo Alto, CA (US); Xie Xu, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/545,464

(22) Filed: Dec. 19, 2023

(65) Prior Publication Data

US 2024/0330283 A1 Oct. 3, 2024

Related U.S. Application Data

(63) Continuation-in-part of application No. 18/194,357, filed on Mar. 31, 2023, now Pat. No. 11,907,212.

(51) Int. Cl.
*G06F 16/00* (2019.01)
*G06F 16/23* (2019.01)
*G06F 16/242* (2019.01)
*G06F 16/25* (2019.01)

(52) U.S. Cl.
CPC ...... *G06F 16/2448* (2019.01); *G06F 16/2358* (2019.01); *G06F 16/252* (2019.01); *G06F 16/258* (2019.01)

(58) Field of Classification Search
CPC ............... G06F 16/2448; G06F 16/258; G06F 16/2358; G06F 16/252
USPC .................................................. 707/600–899
See application file for complete search history.

(56) References Cited

U.S. PATENT DOCUMENTS

| | | | |
|---|---|---|---|
| 9,720,746 B2* | 8/2017 | Zhu | G06F 8/75 |
| 10,819,556 B1* | 10/2020 | Rangasamy | H04L 41/0213 |
| 11,093,607 B1 | 8/2021 | Nachenberg et al. | |
| 11,461,218 B1 | 10/2022 | Malamut et al. | |
| 11,487,778 B1 | 11/2022 | Dageville et al. | |
| 11,487,870 B1 | 11/2022 | Cruanes et al. | |
| 11,907,212 B1 | 2/2024 | Hamilton et al. | |
| 12,141,137 B1* | 11/2024 | Arora | G06F 16/2477 |
| 2014/0137241 A1 | 5/2014 | Smith et al. | |

(Continued)

OTHER PUBLICATIONS

"U.S. Appl. No. 18/404,734, Notice of Allowance mailed Nov. 20, 2024", 8 pages.

(Continued)

*Primary Examiner* — Michelle N Owyang
(74) *Attorney, Agent, or Firm* — Schwegman Lundberg & Woessner, P.A.

(57) ABSTRACT

Provided herein are systems and methods for configuring extended telemetry metric data types. A system includes at least one hardware processor coupled to a memory and configured to detect an API call at an execution node of a database system. Metric data emitted by a telemetry API corresponding to the API call is collected. The metric data is converted from a first data format associated with the telemetry API to a second data format to generate formatted metric data. The second data format is a native format to an event table of the database system. Telemetry data based on the formatted metric data is ingested into the event table.

30 Claims, 11 Drawing Sheets

(56) References Cited

U.S. PATENT DOCUMENTS

| | | |
|---|---|---|
| 2015/0007259 A1 | 1/2015 | Peterson |
| 2015/0178342 A1* | 6/2015 | Seering .................... G06F 7/36 |
| | | 707/754 |
| 2017/0010816 A1 | 1/2017 | Chen et al. |
| 2019/0045008 A1* | 2/2019 | Murthy ................ G06F 16/212 |
| 2021/0248023 A1 | 8/2021 | Brown |
| 2021/0264195 A1* | 8/2021 | Ingram ............... G06F 16/5866 |
| 2021/0399954 A1 | 12/2021 | Dabell et al. |
| 2022/0109899 A1 | 4/2022 | Wann et al. |
| 2022/0291928 A1 | 9/2022 | Chen et al. |
| 2022/0353589 A1 | 11/2022 | Chawla et al. |
| 2022/0414026 A1 | 12/2022 | Iyer et al. |
| 2023/0118838 A1 | 4/2023 | Hulick, Jr. |
| 2024/0039808 A1 | 2/2024 | Singwi et al. |
| 2024/0202187 A1 | 6/2024 | Hamilton et al. |

OTHER PUBLICATIONS

"U.S. Appl. No. 18/404,734, Non Final Office Action mailed Jul. 25, 2024", 23 pgs.

"U.S. Appl. No. 18/404,734, Response filed Oct. 24, 2024 to Non Final Office Action mailed Jul. 25, 2024", 13 pgs.

"U.S. Appl. No. 18/194,357, Non Final Office Action mailed Jun. 23, 2023".

"U.S. Appl. No. 18/194,357, Notice of Allowance mailed Oct. 19, 2023", 8 pgs.

"U.S. Appl. No. 18/194,357, Response filed Sep. 25, 2023 to Non Final Office Action mailed Jun. 23, 2023", 14 pgs.

\* cited by examiner

600

```
JavaScript
{
    "scope_attributes" : {},
    "value" : "this is a string",
    "value_type" : "STRING",
    "timestamp" : "1687714978531000000",
    "start_timestamp" : "1687714978530000000",
    "record_type": "METRIC",
    "record": {
        "metric_type": "gauge",
        "value_type": "double",
    },
    "metric": {
        "name": "null_count",
        "description" : "A simply gauge test"
    },
    "record_attributes": {
    "other_record_attributes" : "this is a record attribute"
    },
    "resource_attributes" : {}
}
```

FIG. 6

```
Copy into event_table_name from (
  select
        to_timestamp_ntz($1: timestamp: :string),
        to_timestamp_ntz($1: start_timestamp: :string),
        to_timestamp_ntz($1: observed_timestamp: :string),
        $1:trace,
        $1:resource,
        $1:resource_attributes,
        $1:scope,
        $1:scope_attributes,
        $1:record_type,
        $1:record,
        $1:record_attributes,
        (case
              when $1:value_type= 'INTEGER'
              then to_variant($1:value: :integer)
              when $1:value_type= 'DOUBLE'
              then to_variant($1:value: :double)
              when $1:value_type= 'BOOLEAN'
              then to_variant($1:value: :boolean)
              when $1:value_type= 'STRING'
              then to_variant($1:value: :string)
              when $1:value_type= 'ARRAY'
              then to_variant($1:value: :array)
              when $1:value_type= 'OBJECT'
              then to_variant($1:value: :object)
              when $1:value_type= 'TIMESTAMP_LTZ'
              then to_variant(to_timestamp_ltz($1:value: :string))
              when $1:value_type= 'TIMESTAMP_NTZ'
              then to_variant(to_timestamp_ntz($1:value: :string))
              when $1:value_type= 'TIMESTAMP_TZ'
              then to_variant(to_timestamp_tz($1:value: :string))
              when $1:value_type= 'BINARY'
              then to_variant(to_binary_ltz($1:value: :string, 'BASE64'))
              when $1:value_type= 'NULL_VALUE'
              then to_variant($1:value)
              when $1:value_type= 'NULL'
              then to_variant($1:value)
              else $1: value
        end),
        $1: exemplars
        from {json_file}
)
file_format=(type=json, comression=gzip)
on_error=continue;
```

FIG. 7

EXTENDED TELEMETRY METRIC DATA TYPES

CROSS-REFERENCE TO RELATED APPLICATIONS

The present application is a continuation-in-part of U.S. Non-Provisional patent application Ser. No. 18/194,357, entitled "TRACE EVENTS IN A DATABASE SYSTEM," filed on Mar. 31, 2023.

TECHNICAL FIELD

Embodiments of the disclosure generally relate to databases and, more specifically, to configuring telemetry data (such as trace events, log data and metrics), managed event tables for logging the telemetry data (e.g., logging data from User-Defined Functions (UDF) executing in a secure environment), and extended telemetry metric data types used in a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Various entities and companies use databases to store information that may need to be accessed or analyzed.

Cloud-based data warehouses and other data platforms sometimes provide support for UDFs that enable such systems to perform operations that are not available through built-in, system-defined functions.

BRIEF DESCRIPTION OF THE DRAWINGS

The present disclosure will be understood more fully from the detailed description given below and from the accompanying drawings of various embodiments of the disclosure.

FIG. 6 shows an example of a record in an event table JavaScript Object Notation (JSON) file generated by a data formatting component during the processing of metric data, according to some example embodiments.

FIG. 7 shows an example of a COPY command that can be used by a data transforming component during the processing of metric data, according to some example embodiments.

DETAILED DESCRIPTION

Figure 1:
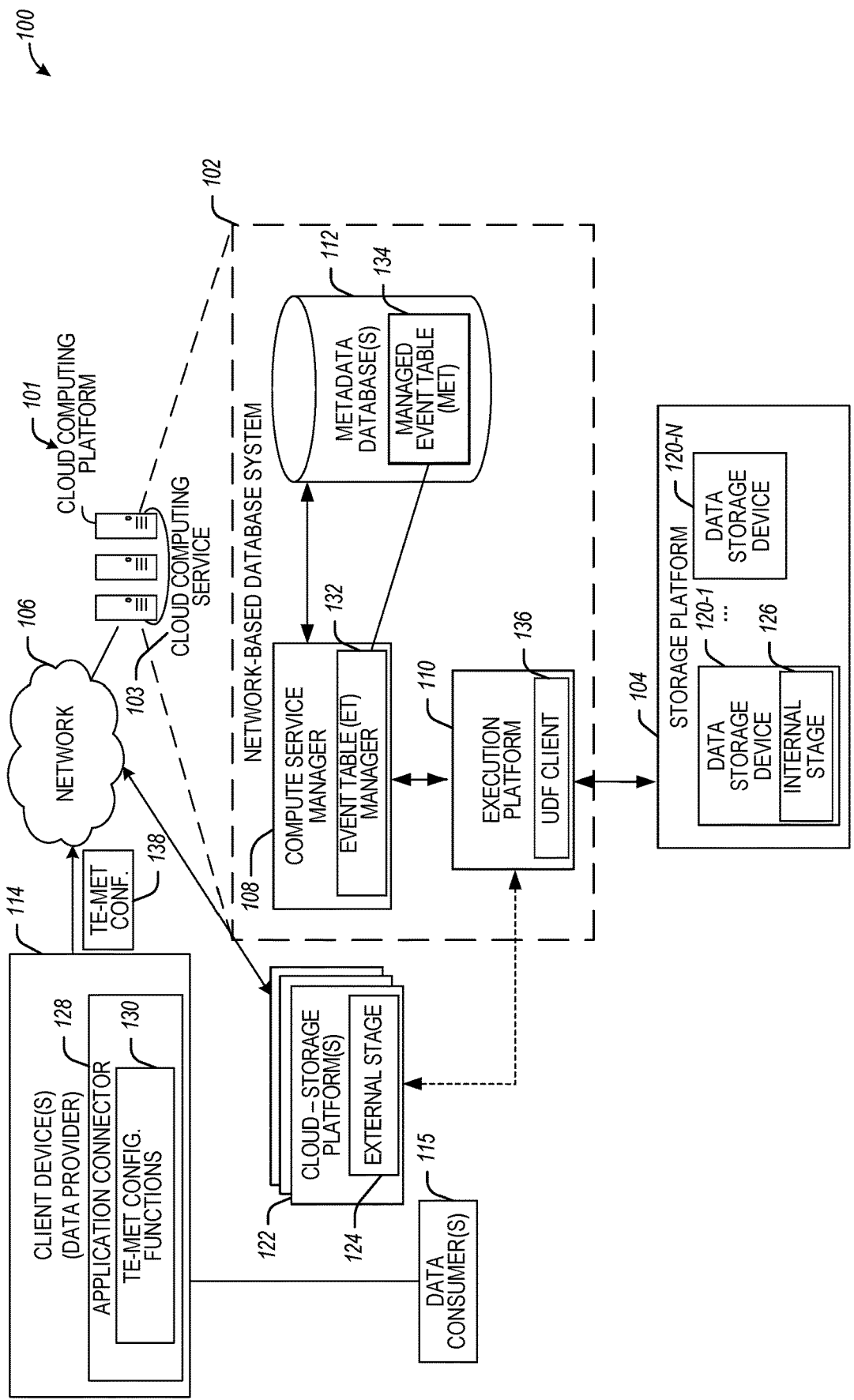
FIG. 1 illustrates an example computing environment that includes a network-based database system in communication with a cloud storage platform, according to some example embodiments.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts. Users and/or executing processes that are associated with a given customer account may, via one or more types of clients, be able to cause data to be ingested into the database and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object, such as a database, may contain one or more objects, such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

In computer security, a sandbox (e.g., sandbox environment) is a security mechanism for separating running programs, usually to prevent system failures or exploitation of software vulnerabilities. A sandbox can be used to execute untested or untrusted programs or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices, can be disallowed or restricted. UDFs typically can run in a sandbox environment.

Generating events (e.g., log events associated with logging and trace events associated with tracing) from UDFs is important for debuggability during development and troubleshooting issues in production. Some existing solutions recommend that users log into tables from the UDF. Still, this approach is not scalable because users need to manage the table and explicitly write SQL queries to insert logs into the table. Moreover, inserting events into tables is not the standard procedure that programmers are accustomed to when using programming languages (e.g., Java, Python, etc.).

Some programs execute on multi-tenant cloud environments, and their programs include UDFs. The programs can be executed in safe environments to provide security. However, by executing in safe environments, the UDFs are not able to log data. Additionally, any log data collected during a function execution or a procedure execution is mostly ad-hoc and unstructured, making a subsequent search or query more challenging and time-consuming.

As used herein, the term "telemetry data" includes trace event (TE) data, log data, and metric data (or metrics).

As used herein, the term "log data" (or log) indicates a record of transactions or activities that take place on a computer system. In one aspect, systems and methods are presented to provide managed event tables for generating log data from UDFs executing in a secure sandbox environment. Log data is treated as sensitive and handled with appropriate security policies, as with any other user data in the system. Logs are a common form of telemetry data, and log payloads are often not structured. Users can emit log messages at any time, and the payload may contain any information (including sensitive information). Logs are usually used for debugging purposes, and as a result, occasional missing logs generally do not have a direct impact on data processing architectures.

The terms "metrics" and "metric data" are used interchangeably to indicate data obtained in connection with the monitoring of long-lived services. For example, dashboards are often created from metrics to provide insight into certain systems. Metrics can be continuously emitted data, recurrently emitted data (e.g., when UDF execution on a row finishes), and periodically (e.g., every 10 seconds) emitted data, in which case they are typically saved as time-series data. This will provide visibility into system execution across time.

In some aspects, metrics can be statistics. In these cases, metrics emission is typically triggered based on an event instead of a periodic schedule. For example, seconds used for row execution can be tracked as histograms. Another example is to keep track of min/max or the total sum of some values. These metrics will help with understanding the statistical distribution of system workload and performance.

Each metric has a well-defined format (e.g., name, attributes, value data types, a unit of measurement, etc.). Metric data can be associated with a metric data type of a plurality of metric data types. In some aspects, the plurality of metric data types is described herein below and can include one or more of an integer metric data type, a double metric data type, a Boolean metric data type, a string metric data type, a binary metric data type, an array metric data type, an object metric data type, a timestamp metric data type, and a null value metric data type.

As used herein, the term "trace event" (TE) indicates one or more values representing a structured payload occurring at an arbitrary point in time. Trace events can be used to capture aperiodic events, similar to logs. Unlike logs, trace events have a structured payload format that includes a set of key-value pairs. This makes them more suitable for capturing counter data for aggregation at a later query phase. In some aspects, trace events can be used for usage analysis with relatively low volume and, therefore, are associated with higher quality of service (QoS) applications. In some aspects, trace events can be auto-instrumented without additional API calls.

The disclosed TE-related techniques can be used to capture telemetry data related to the execution of UDFs and stored procedures and to allow users to query the recorded events effectively. Alternatively, users may emit log messages to capture details regarding a function/procedure execution. However, log messages are usually ad-hoc and unstructured, making the search/query harder. As used herein, the term UDFs includes user-defined functions as well as user-defined table functions (UDTFs), stored procedures, and user-defined aggregate functions (UDAFs).

The disclosed telemetry data processing techniques can be based on adding events during distributed tracing from a distributed tracing package such as OpenTelemetry. In this regard, the events used to obtain the telemetry data are referred to as trace events. In some aspects, the more complex OpenTelemetry APIs can be wrapped into a simpler API, allowing users the capability to trigger a trace event in an API call and generate structured telemetry data that is more suitable for querying. For example, TEs can be used to capture some numbers that are calculated during the execution of their function and analyze these numbers afterward in a table. In some aspects, TEs are configured to use a structured payload to enable the querying of semi-structured (i.e., VARIANT) data. In this regard, TEs are helpful when data is recorded for subsequent aggregation/analysis. In some aspects, TEs can be configured to automatically include execution statistics (e.g., executed row count) that are not easily accessible to users.

As used herein, the terms "event table" (ET) and "managed event table" (MET) are interchangeable and indicate a table used as a destination for telemetry data such as logs and metric data associated with UDF execution. For example, a MET is a type of table in an event-driven architecture that is provided as a destination for log data generated from UDFs executing in a sandboxed environment. Users can query a MET in the same way as a regular table. In some embodiments, a MET can be attached to an object (e.g., an Account object, a Database object, a Schema object, etc.) and can be used as the destination for logs/trace events/metrics originating from objects under that parent object. In some embodiments, a MET can be attached to an Account object, with the parent object of the MET being a schema object.

In some aspects, the OpenTelemetry data models support integers and doubles as metric value types without support for additional metric data types. This is mainly because the additional metric data types (e.g., Boolean, string, timestamp, etc.) do not have well-defined metric semantics in existing telemetry data models (e.g., a unit of measure, aggregation, and sampling), making representation and visualization of such metric data types challenging.

Integer and double data types suffice regular metrics use cases. However, given the various data types (e.g., timestamp, array, object) supported by a network-based database system, there can be numerous use cases demanding gauge values of any metric data type. For example, a network-based database system can emit gauges of metric data types such as Boolean and timestamp, and machine learning (ML) monitor features can emit gauges of binary type.

The disclosed techniques can be used to extend metric data type support using the existing OpenTelemetry framework. In some aspects, the disclosed techniques can use logs, which provides a significant degree of flexibility. A user can structure their metrics into log messages and parse the log messages to obtain the metric values. This option, however, can be based on telemetry generation and consumption, which are primarily done by the caller/user.

In some aspects, the disclosed techniques can be based on using a metrics data model to support extended data types via record attributes. More specifically, a set of metrics APIs can be used by a user to emit metric data of various types. When emitting metrics of non-numeric data types (e.g., as explained in the description of FIG. 5), a caller sets the type and value in record attributes. As used herein, the term "caller" indicates an API call associated with extended telemetry metric data types. These metrics can be collected as telemetry data by a telemetry pipeline and ingested into an event table. The event table can be configured to identify the passed-in values as the correct data type as specified by the users. Users can then read the metric data directly from the event table without any conversion. The disclosed telemetry pipeline can automatically infer the metric type and save the metric in a corresponding VALUE column of an event table in the corresponding metric data type.

The various embodiments that are described herein are described with reference where appropriate to one or more of the various figures. An example computing environment, including a compute service manager with an ET manager configured to perform TE and MET configuration functions as well as data manipulation configuration associated with the processing of telemetry data (e.g., extended telemetry metric data types), is discussed in connection with FIGS. 1-3. Example ET manager functionalities, including MET configuration functions, TE configuration functions, and data manipulation functions in connection with the generation of telemetry data (including metric data), are discussed in connection with FIGS. 4-10. A more detailed discussion of example computing devices that may be used with the disclosed techniques is provided in connection with FIG. 11.

FIG. 1 illustrates an example computing environment 100 that includes a database system in the example form of a network-based database system 102, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not explicitly described herein. In other embodiments, the computing environment may comprise another type of network-based database system or a cloud data platform. For example, in some aspects, the computing environment 100 may include a cloud computing platform 101 with the network-based database system 102 and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™ and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources, including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts, such as end-users providing data storage and retrieval requests, system administrators managing the systems and methods described herein, and other components/devices that interact with compute service manager 108.

The compute service manager 108 is also communicating with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as remote computing device or user device 114) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 101 (e.g., cloud computing service 103) by way of a network 106, such as the Internet or a private network. A data consumer 115 can use another computing device to access the data of the data provider (e.g., data obtained via the client device 114).

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128, which may be configured to perform trace event (TE) or managed event table (MET) (collectively referred to as TE-MET) configuration functions 130. For example, client device 114 can be associated with a data provider using the cloud computing service 103 of the network-based database system 102. In some embodiments, TE-MET configuration functions 130 include generating TE and/or MET configurations 138 (also referred to as TE-MET configurations 138) for communication to the network-based database system 102 via network 106. For example, TE-MET configurations 138 can be communicated to ET manager 132 within the compute service manager 108. The ET manager 132 is configured to perform TE or MET configuration functions, which can be based (at least partially) on one or more of the TE-MET configurations 138. For example, the ET manager 132 can configure MET 134 based on the TE-MET configurations 138, with the MET 134 used in connection with generating trace event data associated with a UDF execution. For example, the TE-MET configurations 138 can further configure one or more TEs, resulting in structured telemetry data being ingested into the MET 134 for subsequent querying or other processing. In some aspects, the UDF execution can be configured using the UDF client 136, which is part of the execution platform 110.

In some aspects, the TE-MET configurations 138 include configurations used by the ET manager 132 to configure functionalities of the MET components, including the data manipulation manager 509 and the ingestion scheduling component 514, in connection with processing API calls and ingesting telemetry data of one or more metric data types (e.g., as discussed in connection with FIG. 5).

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a replication group object). Additionally, the metadata database 112 can also store MET 134. In some embodiments, MET 134 can be stored in the execution platform 110, the storage platform 104, or the cloud-storage platforms 122.

Figure 3:
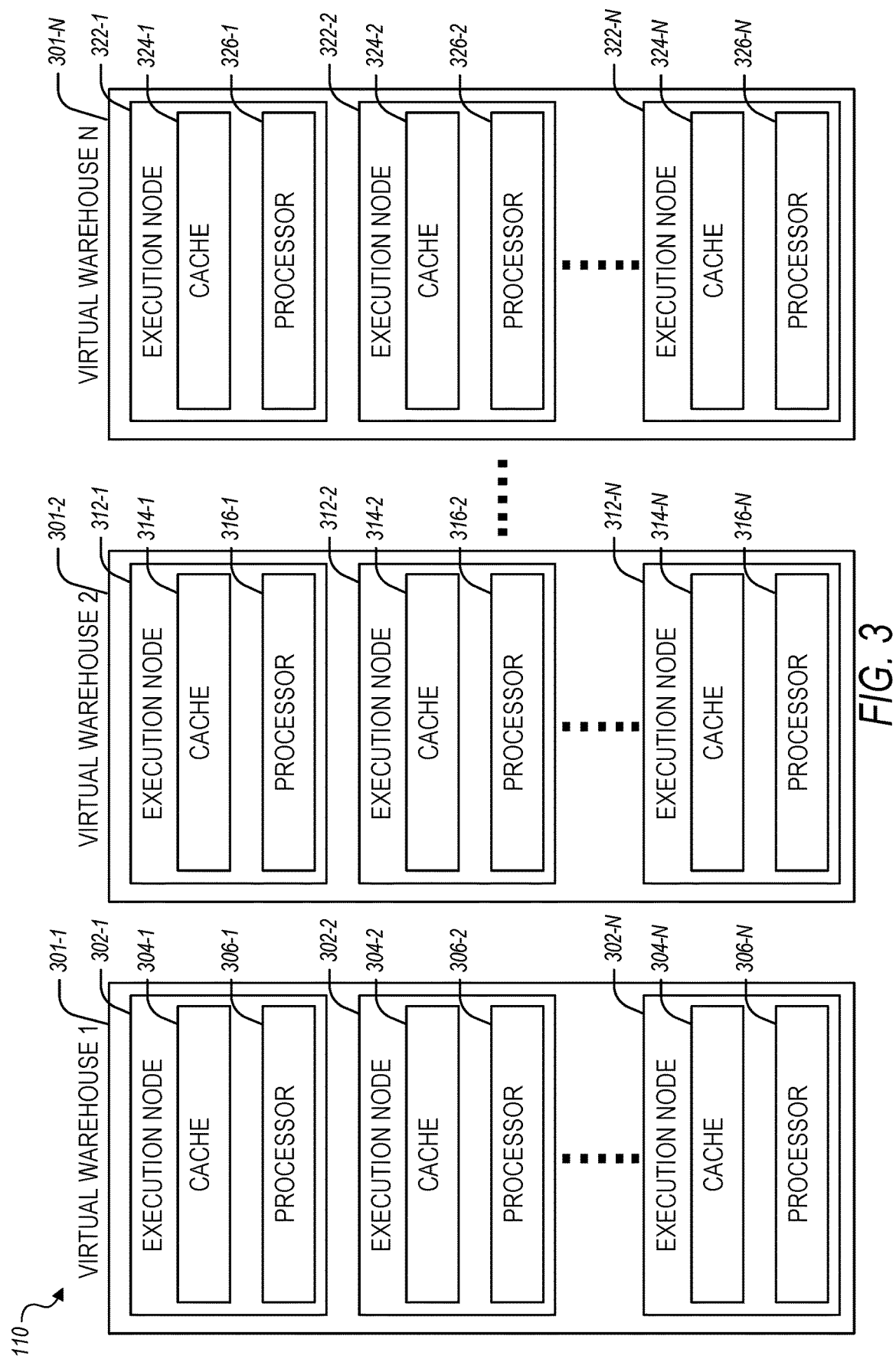
FIG. 3 is a block diagram illustrating components of an execution platform, according to some example embodiments.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, as mentioned above, the compute service manager 108 includes the ET manager 132. The ET manager 132 comprises suitable circuitry, interfaces, logic, and/or code and is configured to perform the disclosed functionalities associated with the configuration and use of TEs and METs in connection with telemetry data (e.g., structured telemetry data, log data, metric data, or another type of data) associated with UDF execution. For example, as discussed in connection with FIGS. 4-5, ET manager 132 can configure generation, processing (e.g., via MET components 413), and ingestion (e.g., via ingestion component 502) of telemetry data (e.g., transformed telemetry data 515 based on telemetry data 508) into MET 134. Additional functionalities associated with TE and MET configuration are discussed in connection with FIGS. 4-10.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 processes the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from and store data to any of the data storage resources in the cloud storage platform 104.

Figure 2:
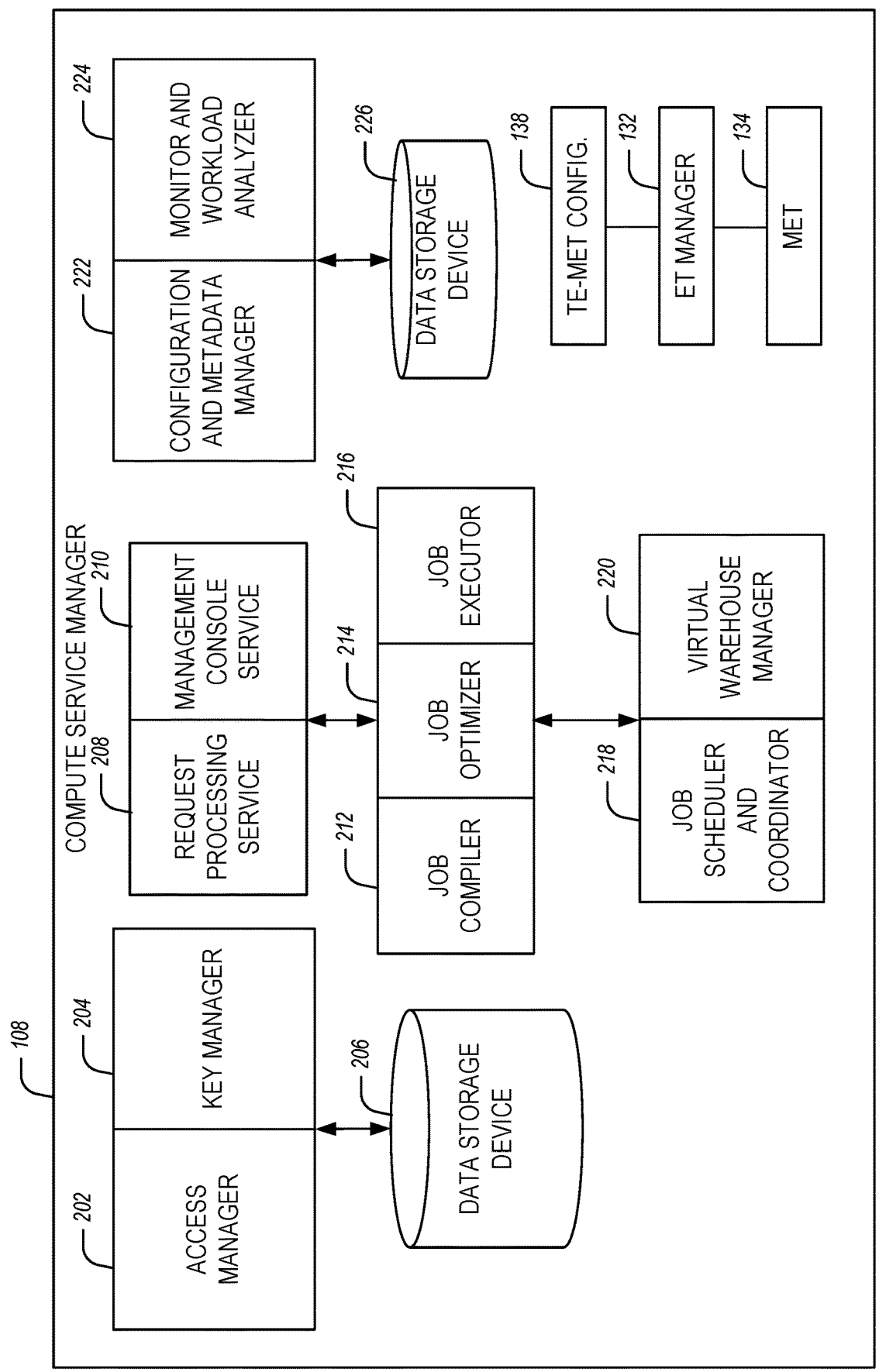
FIG. 2 is a block diagram illustrating the components of a compute service manager, according to some example embodiments.

FIG. 2 is a block diagram illustrating components of the compute service manager 108, according to some example embodiments. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources, such as data resources, in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs, such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2) and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

As previously mentioned, the compute service manager 108 includes the ET manager 132 configured to perform the disclosed functionalities associated with the configuration (e.g., using TE-MET configurations 138) and use of TEs and one or more METs (e.g., MET 134) for storage and access of telemetry data including log data, metric data, and structured telemetry data (e.g., trace event data) associated with UDF and stored procedure execution. Additional functionalities performed by the ET manager 132 are discussed in connection with at least FIGS. 4-10.

FIG. 3 is a block diagram illustrating components of the execution platform 110, according to some example embodiments. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, they can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes: 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes: 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes: 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues and network overhead). In some example embodiments, the imbalances are addressed at the scan level using a file-stealing scheme. In particular, whenever a node process completes scanning its set of input files, it requests additional files from other nodes. If one of the other nodes receives such a request, the node analyzes its own set (e.g., how many files are left in the input file set when the request is received) and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 120-1) and does not download the files from the transferring node. In this way, lagging nodes can transfer files via file stealing in a way that does not worsen the load on the lagging nodes.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104. Still, each virtual warehouse has its execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

Figure 4:
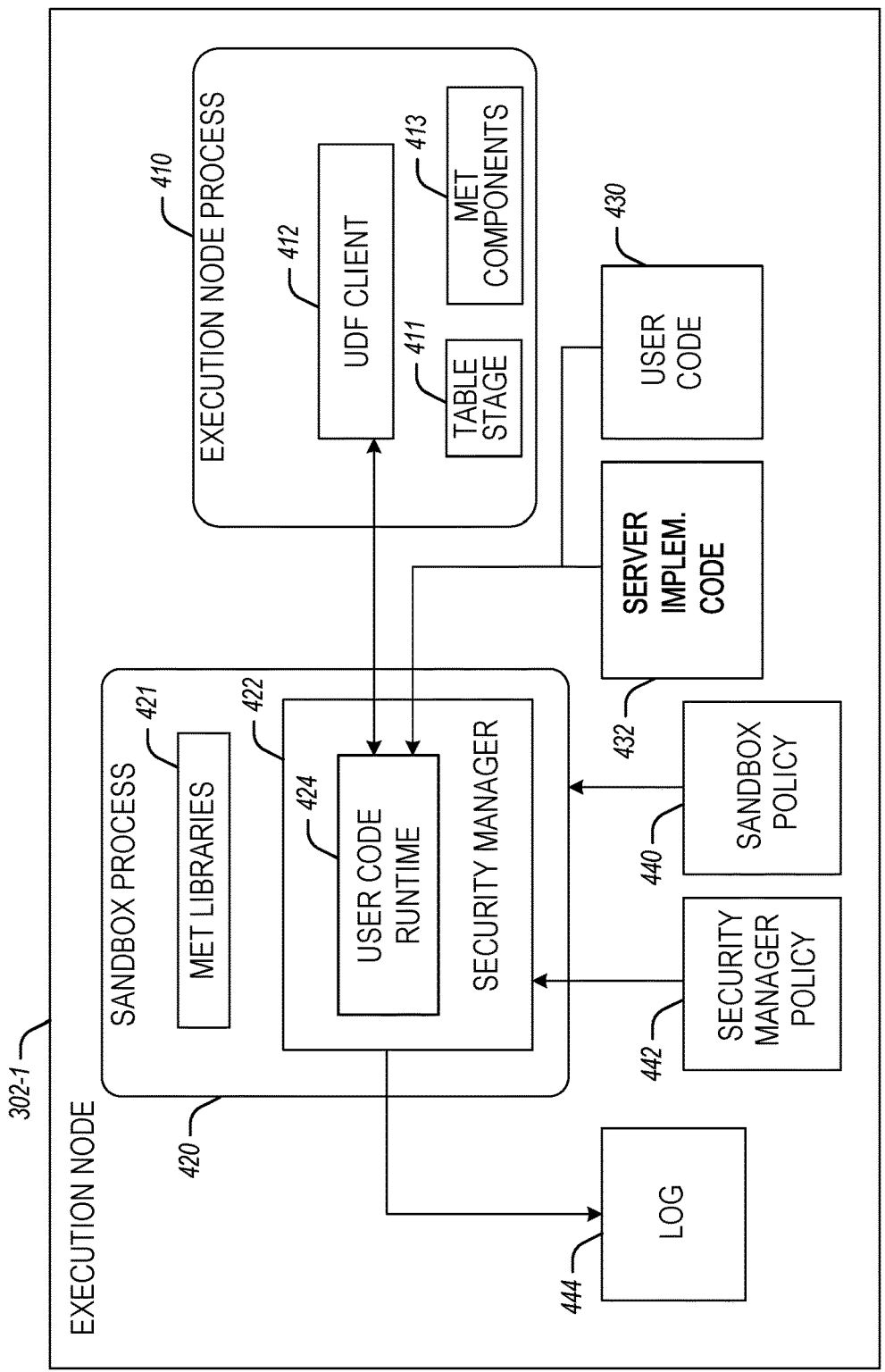
FIG. 4 is a computing environment conceptually illustrating a computing architecture executing a UDF by a process running on a given execution node of the execution platform, according to some example embodiments.

FIG. 4 is a computing environment 400 conceptually illustrating a computing architecture executing a UDF by a process running on a given execution node of the execution platform 110, according to some example embodiments.

In computer security, a sandbox (e.g., sandbox environment) is a security mechanism for separating running programs, usually to mitigate system failures or software vulnerabilities from spreading. A sandbox can be used to execute untested or untrusted programs or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices, can be disallowed or restricted.

As illustrated, the execution node 302-1 from the execution platform 110 includes an execution node process 410, which, in an embodiment, is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query, and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA and the like. In an embodiment, the UDF client 412 is implemented in a different programming language (e.g., C or C++) than the user code 430, which can further improve the security of the computing environment 400 by using a different codebase (e.g., one without the same or fewer potential security exploits).

User code 430 may be provided as a package, e.g., in the form of a JAR (JAVA archive) file, which includes code for one or more UDFs. Server implementation code 432, in an embodiment, is a JAR file that initiates a server that is responsible for receiving requests from the execution node process 410, assigning worker threads to execute user code, and returning the results, among other types of server tasks.

In an implementation, an operation from a UDF (e.g., a JAVA-based UDF) can be performed by a user code runtime 424 executing within a sandbox process 420 (described further below). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in log 444 for review and retrieval. In an embodiment, the log 444 can be stored locally in memory at the execution node 302-1 or in a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records, or cells; utilizes efficient remote procedure call techniques and network protocol(s)

for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the advantages described above.

Security manager 422, in an example, can prevent the completion of an operation from a given UDF by throwing an exception (e.g., if the operation is not permitted) or returning (e.g., doing nothing) if the operation is permitted. In an implementation, the security manager 422 is implemented as a JAVA security manager object that allows applications to implement a security policy such as a security manager policy 442 and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424), therefore, can allow or disallow the operation based on the security policy, at least in part.

Sandbox process 420, in an embodiment, is a sub-process (or a separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is lightweight in comparison to the execution node process 410 and is optimized (e.g., closely coupled to security mechanisms of a given operating system kernel) to process a database query securely within the sandbox environment.

In an embodiment, the sandbox process 420 can utilize a virtual network connection to communicate with other components within the subject system. A specific set of rules can be configured for the virtual network connection concerning other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to specific computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which, in practice, means that the sandbox process 420 resides in a separate memory space from the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

In some embodiments, the sandbox process 420 can be used for configuring one or more MET libraries 421 for executing an event table instance (e.g., as discussed in connection with FIG. 5). Additionally, the execution node process can be configured with a table stage 411 and MET components 413 (e.g., components 510-514 in FIG. 5), which can be used in connection with MET-related functions (e.g., as discussed in connection with FIG. 5).

Figure 5:
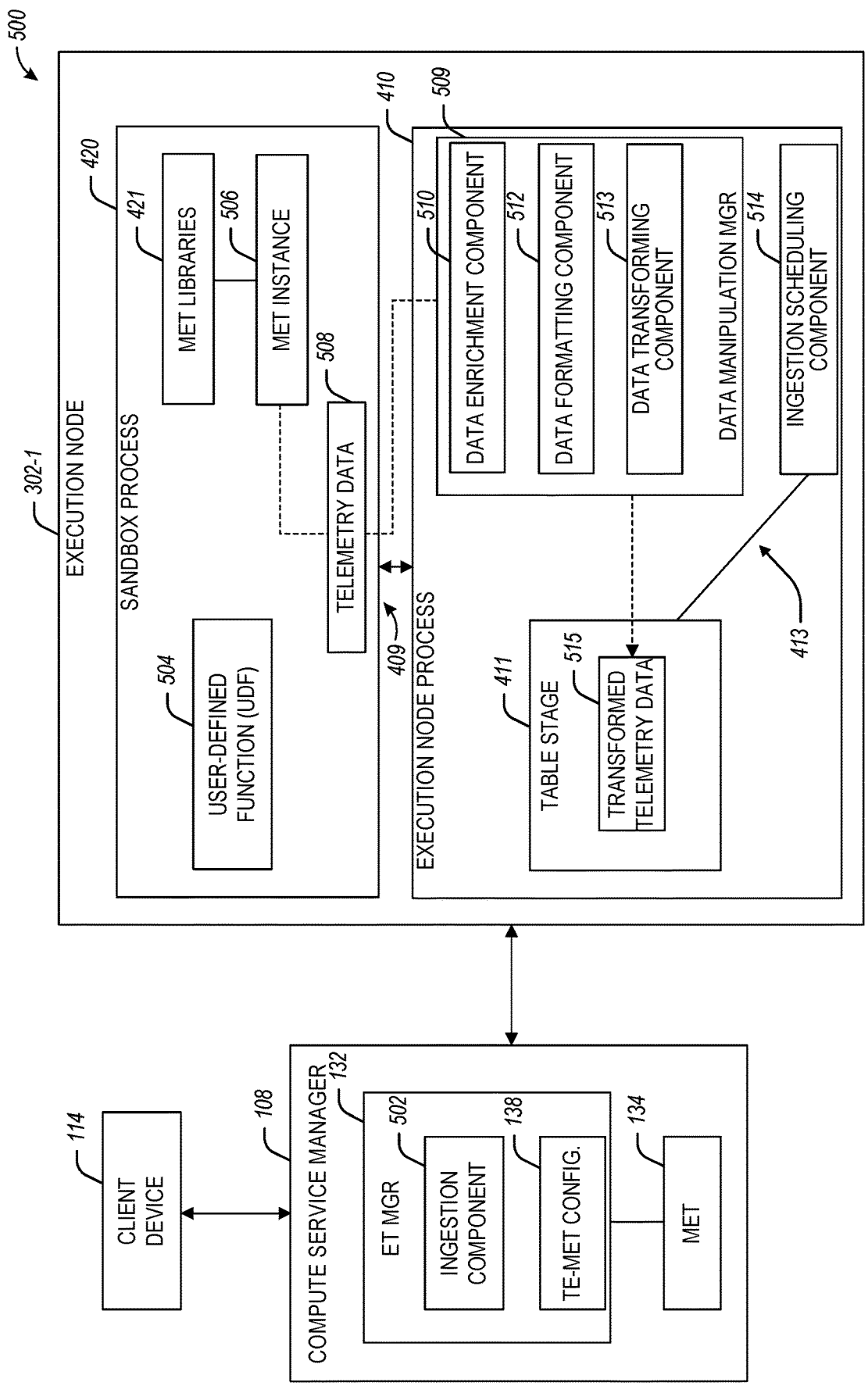
FIG. 5 shows an example of a computing architecture for providing managed event tables for generating trace events from UDFs executing in a secure environment, according to some example embodiments.

FIG. 5 shows an example of a computing architecture 500 for providing managed event tables for generating trace events from UDFs executing in a secure environment, according to some example embodiments.

In some aspects, a MET (e.g., MET 134) is configured and managed by the ET manager 132 of the network-based database system 102 and provides functionality that allows users to query the stored telemetry data similar to a regular table. As mentioned above, a MET can be attached to a parent object, such as an account, database, schema, and the like, and provides a destination for telemetry data (e.g., trace event data or log data) originating from the parent object and/or any objects under the parent object.

In some embodiments, the network-based database system 102 provides users with an API command for creating a new MET. For example, the API command may be provided in an SQL syntax and allows a user to either create or replace an event table, as well as define a name for the event table. A user may, therefore, use the API (e.g., via the client device 114) to create an event table, thereby causing telemetry data (including metric data) generated by specified UDFs to be automatically collected and entered into the event table. The user may then simply query the event table (e.g., MET 134) to access the stored trace event data. The implementation and operation of event tables are described in reference to the computing architecture 500 in FIG. 5.

As shown, the computing architecture 500 includes a client device 114, a compute service manager 108, and an execution node 302-1. The execution node 302-1 includes a sandbox process 420 and an execution node process 410. A UDF 504 is executing within the sandbox process 420. The sandbox process 420 separates the UDF 504 from the other services and processes of the computing architecture 500 and may also limit the resources (e.g., storage, memory, etc.) and functionality available to the UDF 504.

The sandbox process 420 is loaded with event table libraries (e.g., MET libraries 421) to facilitate the processing of telemetry data, including metric data as well as automated generation of trace events of the UDF 504 in MET 134. The MET libraries 421 are programming libraries that cause the execution of MET instance 506 within the sandbox process 420. The MET instance 506 captures telemetry data 508 (e.g., trace event data, log data, or metric data) generated by the UDF 504 executing in the sandbox process 420. For example, the MET instance 506 may intercept log or API calls generated by the UDF 504.

The MET instance 506 funnels the captured telemetry data 508 to the execution node process 410. For example, the MET instance 506 may communicate the captured telemetry data 508 (e.g., metric data, trace event data, or log data) to the execution node process 410 using a remote procedure call 409 (e.g., a Google Remote Procedure Call (gRPC)) that is used to communicate with the execution node process 410.

As shown, the execution node 302-1 is further configured with a table stage 411 and MET components 413, which can be part of the execution node process 410. The MET components 413 include a data manipulation manager 509 and an ingestion scheduling component 514. The data manipulation manager 509 can be configured by the ET manager 132 and can include a data enrichment component 510, a data formatting component 512, and a data transforming component 513.

A managed event table (e.g., MET 134) is automatically assigned a table stage 411, where telemetry data associated with the MET 134 is initially stored. Table stage 411 is a storage location that is internal to the execution node process 410. The trace event data stored at table stage 411 may not be accessible to an end-user. The execution node process 410 stores telemetry data such as transformed telemetry data 515 based on the telemetry data 508 received from the MET instance 506 in table stage 411.

In some aspects, the MET instance 506 intercepts an API call generated by the UDF 504, with the API call emitting metric data of a metric data type of a plurality of metric data types (e.g., an integer metric data type, a double metric data type, a Boolean metric data type, a string metric data type, a binary metric data type, an array metric data type, an object metric data type, a timestamp metric data type, and a null value metric data type).

Example APIs that can be used to emit metric data associated with a metric data type are described herein below. Integer and double are OpenTelemetry native types and are also included for completeness. In some aspects, the APIs discussed below and used to emit metric data can be configured in JavaScript but can also be applied to other programming languages with corresponding configuration.

In some aspects, the API used for emitting metric data can be a JavaScript API that includes a reference to a gauge using a meter function to collect the metric data.

TABLE 1

| RECORD_TYPE | RECORD |
|---|---|
| "METRIC" | {<br>"metric_type": "gauge",<br>"metric": {<br>"name": "example_gauge",<br>"description": "A gauge"<br>}<br>} |

Table 1 lists an example configuration of the MET 134, such as a row of metric data type. Such a row can be used to store telemetry data of a metric data type.

Table 2 below illustrates an example API that can be used for emitting metric data of an integer metric data type.

TABLE 2 let gauge = meter.createObservableGauge("example_gauge", {
description: "A gauge",
valueType: 0
});
gauge.addCallback((result) => {
result.observe(0, { });
});

This API can support up to signed int64. An example event table representation for the integer metric data type is listed in Table 3.

TABLE 3

| RECORD_ATTRIBUTES | VALUE (type of INT) |
|---|---|
| | 1 |

Table 4 below illustrates an example API that can be used for emitting metric data of a double metric data type.

TABLE 4 let gauge = meter.createObservableGauge("example_gauge", {
description: "A gauge",
valueType: 1
});
gauge.addCallback((result) => {
result.observe(2.3, { });
});

An example event table representation for the double metric data type is listed in Table 5.

TABLE 5

| RECORD_ATTRIBUTES | VALUE (type of DOUBLE) |
|---|---|
| | 2.3 |

Table 6 below illustrates an example API that can be used to emit metric data of a Boolean metric data type.

TABLE 6 gauge.addCallback((result) => {
result.observe(0,

TABLE 6-continued

```
{
"type": "BOOLEAN",
"value": true
});
```

An example event table representation for the Boolean metric data type is listed in Table 7.

TABLE 7

| RECORD_ATTRIBUTES | VALUE (type of BOOLEAN) |
|---|---|
|  | true |

In some aspects, the VALUE column for this metric data is used for embedding the data type information, and consequently, the RECORD_ATTRIBUTES column is empty.

Table 8 below illustrates an example API that can be used for emitting metric data of a string metric data type.

TABLE 8

```
gauge.addCallback((result) => {
result.observe(0,
{
"type": "STRING",
"value": "Some string"
});
});
```

An example event table representation for the string metric data type is listed in Table 9.

TABLE 9

| RECORD_ATTRIBUTES | VALUE (type of VARCHAR) |
|---|---|
|  | "Some string" |

In some aspects, the VALUE column for this metric data is used for embedding the data type information, and consequently, the RECORD_ATTRIBUTES column is empty.

Table 10 below illustrates an example API that can be used for emitting metric data of a binary metric data type.

TABLE 10

```
gauge.addCallback((result) => {
result.observe(0,
{
"type": "BINARY",
"value": "SEVMUA == " // BASE64 encoded
});
});
```

An example event table representation for the binary metric data type is listed in Table 11.

TABLE 11

| RECORD_ATTRIBUTES | VALUE (type of BINARY) |
|---|---|
|  | "48454C50" |

In some aspects, the parameter "value" for the API of this metric data type holds a Base64 encoded string representing the binary data. The VALUE column for this metric data is used to embed the data type information, and consequently, the RECORD_ATTRIBUTES column is empty.

Table 12 below illustrates an example API that can be used for emitting metric data of an array metric data type.

TABLE 12

```
gauge.addCallback((result) => {
result.observe(0,
{
"type": "ARRAY",
"value": [−1, 12, 289, false, "test"]
});
});
```

An example event table representation for the array metric data type is listed in Table 13.

TABLE 13

| RECORD_ATTRIBUTES | VALUE (type of ARRAY) |
|---|---|
|  | [−1, 12, 289, false, 'test'] |

In some aspects, the parameter "value" for the API of this metric data type holds a JSON array, and non-JSON types (e.g., timestamp) may be unsupported. The VALUE column for this metric data is used to embed the data type information, and consequently, the RECORD_ATTRIBUTES column is empty.

Table 14 below illustrates an example API that can be used for emitting metric data of an object metric data type.

TABLE 14

```
gauge.addCallback((result) => {
result.observe(0,
{
"type": "OBJECT",
"value": { "x" : "abc", "y" : false, "z": 10}
});
});
```

An example event table representation for the object metric data type is listed in Table 15.

TABLE 15

| RECORD_ATTRIBUTES | VALUE (type of OBJECT) |
|---|---|
|  | {<br>"x": "abc",<br>"y": false,<br>"z": 10<br>} |

In some aspects, the parameter "value" for the API of this metric data type holds a JSON object, and non-JSON types (e.g., timestamp) may be unsupported. The VALUE column for this metric data is used to embed the data type information, and consequently, the RECORD_ATTRIBUTES column is empty.

Table 16 below illustrates an example API that can be used for emitting metric data of a timestamp metric data type.

TABLE 16

```
gauge.addCallback((result) => {
result.observe(0,
{
"type": "TIMESTAMP TZ", // or "TIMESTAMP NTZ" / "TIMESTAMP LTZ"
"value": {
"epoch seconds": 1689202774,
"nanoseconds": 123456789,
"timezone": - 420 // negative if west of UTC, positive otherwise
}
});
});
```

In some aspects, the timestamp API takes a JSON object with epoch_seconds, nanoseconds, and a time zone offset in minutes. The nanoseconds can be non-negative and less than 1,000,000,000. The time zone can be negative if west of UTC and positive otherwise.

An example event table representation for the timestamp metric data type is listed in Table 17.

TABLE 17

| RECORD_ATTRIBUTES | VALUE (type of OBJECT) |
|---|---|
| | "2023-07-12 3:59:34.123 -0700" |

In some aspects, the parameter "value" for the API of this metric data type holds a JSON object that can be used to obtain a TIMESTAMP_* data type. In some aspects, this object is used to represent SQL data types, including TIMESTAMP_LTZ, TIMESTAMP_NTZ, and TIMESTAMP_TZ. In some aspects, the telemetry pipeline can transform this JSON object into the corresponding timestamp type. In some aspects, additional configurations can be provided to define behavior when a time zone is not provided with TIMESTAMP_TZ or TIMESTAMP_LTZ or when a time zone is provided with TIMEZONE_NTZ. The VALUE column for this metric data is used to embed the data type information, and consequently, the RECORD_ATTRIBUTES column is empty.

Table 18 below illustrates an example API that can be used for emitting metric data of a null value metric data type.

TABLE 18

```
gauge.addCallback((result) => {
result.observe(0,
{
"type": "NULL_VALUE",
});
});
```

An example event table representation for the timestamp metric data type is listed in Table 19.

TABLE 19

| RECORD_ATTRIBUTES | VALUE (type of OBJECT) |
|---|---|
| {<br>"type": "NULL_VALUE"<br>} | null |

In some aspects, this API expects that the "value" field is not set if the type is specified to be NULL_VALUE.

In some aspects, the telemetry pipeline (e.g., one or more of the components of the data manipulation manager 509, which can be configured by the ET manager 132) internally will verify the supplied value (i.e., parameter "value") has the proper type as indicated by the parameter "type." If the verification fails, the parameters "value" and "type" can be kept as they are in the resource attributes, and the VALUE column will be NULL.

In some aspects, telemetry data 508 detected in an API (e.g., one of the API examples listed above) can be processed in a telemetry pipeline configured as part of the execution node process 410, including the components of the data manipulation manager 509 to obtain transformed telemetry data 515. Example transformations performed by the components of the data manipulations manager 509 are described below.

In some embodiments, the data enrichment component 510 enriches the telemetry data 508 with additional metadata. For example, the metadata may include a timestamp value (e.g., a value identifying the time at which the telemetry data 508 was generated), a query identifier, a session identifier, a warehouse identifier (e.g., a warehouse name), a database name, a schema identifier, a source name, a user name, and the like. The metadata that is added by the data enrichment component 510 may be based on the specifications of a user that created the MET 134, a selected log level, a selected permission level, and the like, which information can be part of the TE-MET configurations 138. In some aspects, the data enrichment component 510 may enrich the telemetry data 508 before the resulting telemetry data (e.g., transformed telemetry data 515) is stored in table stage 411 and/or after the telemetry data is stored in table stage 411. In some embodiments, the table schema used by the MET 134 may be preconfigured (e.g., via the TE-MET configurations 138) based on one or more metric data types associated with the received metric data. Accordingly, the data enrichment component 510 may enrich the telemetry data 508 based on the configured schema.

In some embodiments, the execution node process 410 facilitates ingestion of the telemetry data 508 stored in the table stage 411 to the MET 134. For example, the data formatting component 512 formats the telemetry data 508 into a format that is suitable for ingestion into the MET 134. For example, the data formatting component 512 can be configured to convert the metric data from a first data format associated with the telemetry API to a second data format to generate formatted metric data. In some aspects, the second data format is a format that is native to an event table of the database system (e.g., MET 134). In some aspects, the first data format is an OpenTelemetry (OTEL) JavaScript Object Notation (JSON) format, and the second data format is an event table JSON format. In some aspects, the first format is a JavaScript format that is converted to an OTEL JSON format (and/or another OTEL format expressed as an OTEL proto file) before conversion to the event table JSON.

FIG. 6 shows an example of a record 600 in an event table JSON file generated by the data formatting component 512 during the processing of metric data, according to some example embodiments.

The data transforming component 513 comprises suitable circuitry, logic, interfaces, and/or code and is configured to facilitate the ingestion of the formatted telemetry data generated by the data formatting component 512 into the table stage 411 and the MET 134. For example, the data transforming component 513 can be configured to execute a COPY command on the formatted telemetry data (which is in an event table JSON format) to ingest such data into the table stage 411 and the MET 134.

FIG. 7 shows an example of a COPY command 700 that can be used by a data transforming component during the processing of metric data, according to some example embodiments.

In some aspects, the execution of the COPY command causes further change of the formatted data into the transformed telemetry data 515. In some aspects, the transforming caused by the execution of the COPY command is based on at least one metric data type of a plurality of metric data types associated with the metric data that is part of the event table JSON. For example, during the execution of the COPY command, a value type field in the formatted metric data is matched (e.g., during the ingestion) with a corresponding value type column in the event table, wherein the value type field indicates a metric data type associated with the metric data.

In some aspects, the field "value_type" (e.g., as seen in the example COPY command of FIG. 7) will match the user-specified type, and "value" will hold the value in JSON format. All fields (except for "value_type") can match a column in the event table (e.g., MVET 134). Example inputs and outputs of different metric data types are listed in Table 20 below.

508 includes converting the telemetry data into a file format that is used by the MET 134. For example, the file format used by the MET 134 may be a JSON object and the like.

In some embodiments, the ingestion scheduling component 514 schedules the ingestion of the transformed telemetry data 515 by communicating with the ingestion component 502 of the compute service manager 108. In some aspects, the ingestion component 502 may be part of the ET manager 132. For example, the ingestion scheduling component 514 notifies ingestion component 502 that formatted trace event data is available in table stage 411 and is ready to be ingested into the MET 134. This causes the ingestion component 502 to initiate ingestion of the formatted trace event data from table stage 411 to MET 134.

In some aspects, the ET manager 132 (e.g., via the data manipulation manager 509) detects the availability of the formatted metric data in table stage 411 associated with the execution node process 410 of the execution node. The ET manager 132 then schedules the ingestion (e.g., via the ingestion scheduling component 514) based on the detection of the availability of the formatted metric data. The data transforming component 513 then executes the COPY command to cause the ingestion into MET 134, causing the transformation of the telemetry data and the generation of the transformed telemetry data 515.

The transformed telemetry data 515 ingested into the MET 134 may be queried by a user. For example, a user may use a remote computing device (e.g., client device 114) to communicate with the compute service manager 108 and initiate queries of the MET 134. In some aspects, MET 134 may provide a limited set of query commands that are available to the user. For example, the query commands may include SHOW, DESC, DROP, TRUNCATE, DELETE, ALTER TABLE ADD/DROP ROW ACCESS POLICY. In some embodiments, other query operations/commands may be disallowed.

TABLE 20

| TYPE | "value" provided in the API | JSON value field example (in the event table JSON) | COPY command | Type of value in the event table |
| --- | --- | --- | --- | --- |
| INT | NA | 1 | to_variant($1:value :: integer) | INT |
| DOUBLE | NA | 1.0 | to_variant($1:value :: double) | DOUBLE |
| BOOLEAN | true | true | to_variant($1:value :: boolean) | BOOLEAN |
| STRING | "A string" | "A string" | to_variant($1:value :: string) | VARCHAR |
| BINARY | "AB90" | "AB90" | to variant (to_binary( $1:value: : string, 'BASE64' ) ) | BINARY |
| ARRAY | ["an", "array"] | ["an", "array"] | to_variant($1:value :: array) | ARRAY |
| OBJECT | {"an": "object"} | {"an": "object"} | to_variant($1:value :: object) | OBJECT |
| TIMESTAMP_TZ | { "epoch_seconds": 1689202774, "nanoseconds": 123456789, "timezone": -420 | "1973-11-29T21:33:09 123456789-1:20" | to_variant( to_timestamp_ tz( $1:value :: string ) ) | TIMESTAMP_TZ |
| TIMESTAMP_LTZ | | "1973-11-29T21:33:09 | | TIMESTAMP_LTZ |
| TIMESTAMP_NTZ | } | .123456789" | | TIMESTAMP_NTZ |
| NULL_VALUE | NA | null | to_variant($1:value) | NULL_VALUE |
| NULL | When the value and the type do not match | NULL | to_variant($1:value) | NULL |

The ingestion scheduling component 514 schedules the ingestion of the transformed telemetry data 515 into the MET 134. In some aspects, formatting the telemetry data In some embodiments, the functionality associated with logging data in the MET 134 may be configurable by a user via the TE-MET configurations 138. For example, the telemetry data 508 that is collected by the MET instance 506 and later formatted and transformed for entering into the MET 134 may be configured based on log levels assigned to the MET 134. As another example, the query functionality and/or trace event data that is available to a user may be based on privileges that are assigned to the user and/or the MET 134 (e.g., via the TE-MET configurations 138). The table schema used by the MET 134 may be predefined and not configurable.

In some embodiments, TE-MET configurations 138 (e.g., trace_level and log level) can be used for configuring a trace event (e.g., via trace_level) or a log level (e.g., via log level, to configure which logs are collected as trace event data by the MET instance 506). In some aspects, rules for selecting a log level can include: (a) if a log level is set at object lineage and the session parameter is not set, then the object lineage value is used; (b) if a session parameter is set and no object lineage parameter is set then the session value is used; and (c) if both session and object lineage parameters are set then the more verbose value is used.

In some embodiments, the ET manager 132 can configure the MET 134 based on certain log visibility for specific users (e.g., certain users may be authorized to access only certain logs or trace event data in the MET 134).

Figure 8:
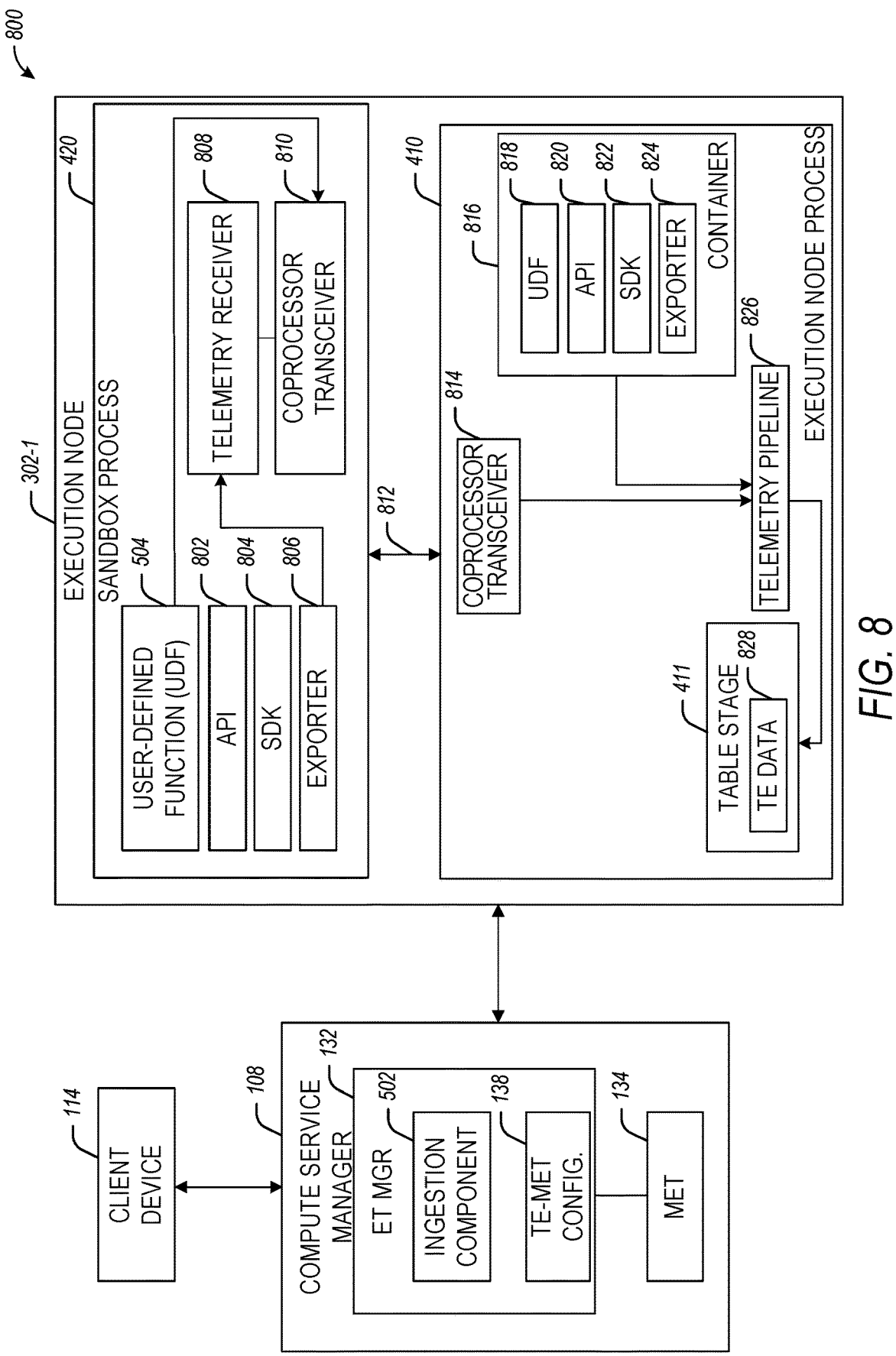
FIG. 8 shows an example of a computing architecture for providing telemetry data, including trace events configured by a trace events manager using an execution node process and a sandbox process, according to some example embodiments.

FIG. 8 shows an example of a computing architecture 800 for providing telemetry data, including trace events configured by a trace events manager using an execution node process and a sandbox process, according to some example embodiments. Referring to FIG. 8, the computing architecture 800 is similar to computing architecture 500 of FIG. 5, except for the sandbox process 420 and the execution node process 410 in FIG. 8 are configured for processing trace events (TEs) to generate telemetry data such as TE data 828 (e.g., structured telemetry data).

In some embodiments, a processing stack is configured within the sandbox process 420, with the processing stack including UDF 504, application programming interface (API) 602 (also referred to as telemetry API 802 or OpenTelemetry API 802), a software development kit (SDK) 804, and exporter manager 806. An API call for a TE can be configured as part of executing the UDF 504. The API call can be mapped to the telemetry API 802, which generates TE data 828 (e.g., structured telemetry data) using SDK 804. The exporter manager 806 communicates the structured telemetry data to the coprocessor transceiver 810 via the telemetry receiver 808. The coprocessor transceiver 810 communicates the structured telemetry data to the coprocessor transceiver 814 at the execution node process 410 via the gRPC 812. The structured telemetry data (e.g., TE data 828) is ingested into table stage 411 (and into, e.g., MET 134) via the telemetry pipeline 826.

In some aspects, OpenTelemetry APIs/SDKs can be embedded into the UDF 504 execution environment as telemetry API 802 and SDK 804. UDF 504 can use wrapping APIs to generate trace events. The OpenTelemetry SDK (e.g., SDK 804) emits telemetry data to an exporter interface (e.g., exporter manager 806), which is configured to collect trace events and export them in the desired format to the event table framework (e.g., to the telemetry pipeline 826). The trace events data (e.g., TE data 828) is stored in an event table (e.g., table stage 411 and MET 134) for subsequent querying.

Figure 9:
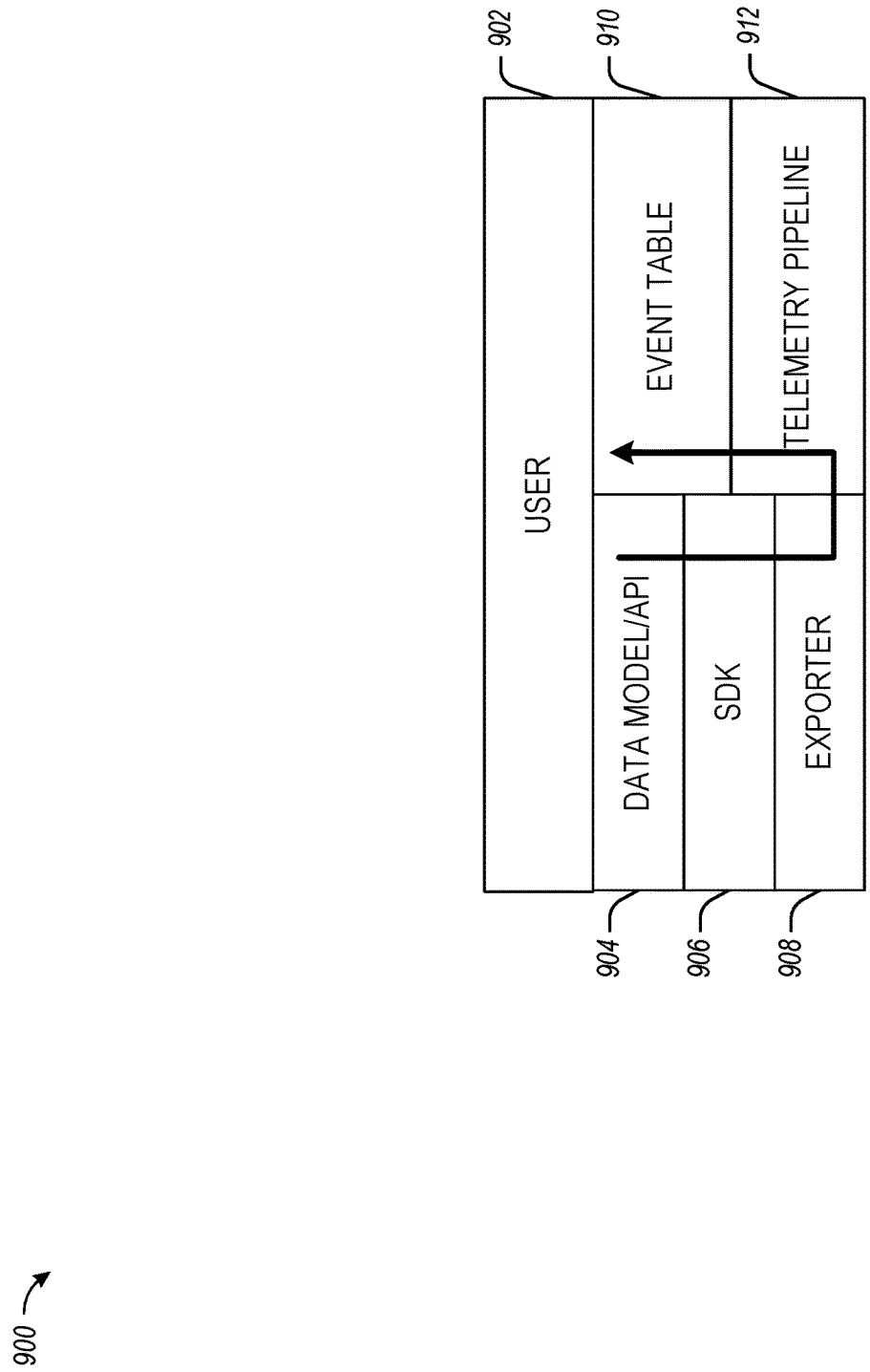
FIG. 9 is a block diagram illustrating the generation and storage of trace events, according to some example embodiments.

Among the various components shown in FIG. 8, the trace event APIs and data model (e.g., as illustrated in FIG. 9), as well as the event table, are visible to users. Events emitted by the OpenTelemetry SDK can be injected into the telemetry pipeline 826 by the exporter manager 806.

In some embodiments, the processing stack includes UDF 818, telemetry API 820, SDK 822, and exporter manager 824 and is configured to execute within container 816 as part of the execution node process 410.

In some aspects, the disclosed techniques are used to define one or more APIs for adding trace events in functions (e.g., UDFs) and procedures. In this regard, API 802 and SDK 804 can be configured using an OpenTelemetry library to support the TE-related functionalities discussed herein. The API calls for a TE detected as part of executing the UDF or procedure are translated into OpenTelemetry code (e.g., by mapping such API calls to a telemetry API 802 and translating it using SDK 804). The OpenTelemetry library then generates outputs (i.e., trace events) in a standard format. In some aspects, the telemetry output is reformatted (e.g., to structured telemetry data) to be suitable for subsequent processing, and the reformatted telemetry output is ingested into an event table. The disclosed TE-related functionalities have the following advantages over existing techniques for generating telemetry data:

(a) Trace events use a structured payload to take advantage of the ability to query semi-structured (i.e., VARIANT) data. In comparison, existing telemetry data types, such as logs, usually have text-based search support.

(b) Trace events can be configured to automatically include execution statistics (e.g., execution row count) that are not easily accessible to users.

(c) Trace events have a standard output format across multiple programming languages. In comparison, existing telemetry data types, such as logs, can have different formats among programming languages. Unlike a log, which is a string tied with the log level, a trace event is a piece of structured data, so having a standard format across languages matters.

(d) When the OpenTelemetry library is used (e.g., in connection with the telemetry API 802 and the SDK 804), user data generated by the OpenTelemetry library can be imported/ingested into a processing database from remote data sources (e.g., sources outside the computing architecture 800).

In some aspects, TEs can be configured to allow a data provider to emit a structured value from within a procedure or function code (e.g., UDF) and can query that data in their provider account. This functionality can be applicable beyond application use cases, potentially to data consumer environments where procedures and functions run. The disclosed TE configurations can be used to allow the emitting of trace events when executing functions and procedures. Trace events can be collected and persisted in an event table for subsequent querying. In some aspects, TEs can be shared in the event table (e.g., from an account of a data provider to an account of a data consumer).

As explained herein above, the term "trace event" indicates a value representing a structured payload occurring at an arbitrary point in time. The use of the term "trace" comes from the use of this type of event in distributed tracing.

The telemetry API 802 and SDK 804 (as well as telemetry API 820 and SDK 822) can be configured according to the OpenTelemetry standard for telemetry data collection and ingestion, including logs, trace events, and metrics for users of the network-based database system 102.

OpenTelemetry (or OTEL) is an open-source project in the distributed system observability space. It is a collection of tools, APIs, and SDKs to instrument, generate, collect, and export telemetry data (metrics, logs, and traces). It is not a complete end-to-end system as it does not provide for storing and analyzing telemetry data. However, the telemetry API 802 and SDK 804 (as well as telemetry API 820 and SDK 822) can be configured according to the OpenTelemetry standard to perform trace event instrumentation, collection, and persistence.

OTEL includes the three primary classes of data collected from distributed systems: logs, metrics, and distributed traces. Telemetry APIs 802 and 820 can be configured as APIs for implementing generating and processing of telemetry data across a broad set of programming languages, including but not limited to Java, JavaScript, Python, and Go. The SDKs 804 and 822 can be used for instrumenting OTEL data across a broad set of programming languages and standard libraries and components.

By using the OTEL APIs and SDKs, users of the network-based database system 102 can write code that is not tied to executing within a database environment of the network-based database system 102 and can be tested without telemetry implementations native to the database environment. For example, without code changes, users can generate events in test environments, collect the event data locally, and then collect data in the database environment when running the code in production. Additionally, by using the OTEL data model and standard serializations, telemetry generated within the network-based database system 102 is compatible with telemetry data created outside of the network-based database system 102.

The event table framework used by the disclosed computing architectures (e.g., computing architecture 800) can be used to store logs from user functions and procedures as well as trace event data (e.g., structured telemetry data). Once the trace event data is emitted, the workflow of saving the data into the event table is similar to that used by logs (i.e., in-memory data to files and then files to the event table via ingestion operations). The access control and billing of trace events can be handled by the computing architecture 800.

FIG. 9 is a block diagram 900 illustrating the generation and storage of trace events, according to some example embodiments. Referring to FIG. 9, user 902 of client device 114 can configure a data model (or API) 904 and SDK 906, which can be configured as OpenTelemetry API and SDK. The API 904 and SDK 906 are used to configure and obtain trace event data, which is communicated to the telemetry pipeline 912 via the exporter manager 908. The telemetry pipeline 912 causes the ingestion of telemetry data (e.g., trace event data, log data, or metric data) into the event table 910. User 902 can then perform further processing (e.g., querying) of the telemetry data stored in the event table 910.

In some aspects, a trace event can be configured to take the form of (name: string [, attributes: map<string, any>]), where name is the name string of the event, and attributes is a set of arbitrary key-value pairs. This model is consistent across all languages supported by OpenTelemetry.

For example, in the case of Python functions and procedures, users could emit a trace event using API calls in their Python code. The following Python stored procedure listed in Table 21 can be used for adding a trace event, adding a trace event with attributes, and setting the attributes of a span.

TABLE 21 create or replace procedure test_sproc( )
returns variant
language python
handler='test_span'
as $$
   from company import telemetry
   def test_span( ):
      telemetry.add_event("SProcEmptyEvent")
      telemetry.add_event("SProcEventWithAttributes",
{"key1": "value1", "key2": "value2"})
      telemetry.set_span_attribute("SProcVersion", "1.1.0")
   return "SUCCESS"
$$;
call test_sproc( );

As used herein, the term "span" indicates a data object associated with a named, timed operation that represents a piece of the workflow in a distributed system. A span holds trace events emitted from a UDF. In some aspects, a span can be auto-instrumented, where predefined TEs can be added to it automatically without user involvement.

Upon completion of the execution of the processing fragment, the span can be emitted to the exporter manager 806 or 908 and can be materialized in the event table.

In some embodiments, each row in an event table (e.g., MET 134) includes a set of columns that describe the event. Example columns, column type, and column description are provided in Table 22 below. In some embodiments, the following three types of events can be recorded:

(a) LOG: the events representing calls to standard logging APIs (e.g., slf4j in Java and logging in Python).

(b) SPAN: these events record the execution of all or part of a user function or procedure. Among other things, spans record the start and end timestamp of execution.

(c) SPAN_EVENT: these are structured trace events generated within the execution of a span. Span events can be created by calling trace event APIs in their function or procedure.

TABLE 22

| Column | Type | Description |
| --- | --- | --- |
| TIMESTAMP | TIMESTAMP_NTZ | The timestamp when an event was created. For events representing a span of time, the end of the time span. |
| START_TIMESTAMP | TIMESTAMP_NTZ | For events representing a span of time, the start of the time span. |
| TRACE | OBJECT | Tracing context for all signal types. Contains string fields trace_id and span_id. |
| RESOURCE_ATTRIBUTES | OBJECT | Attributes that identify the source of an event such as database, schema, user, warehouse, etc. |
| RECORD_TYPE | STRING | Type of the value in the RECORD column (LOG, SPAN, SPAN_EVENT). |

TABLE 22-continued

| Column | Type | Description |
|---|---|---|
| RECORD | OBJECT | Fixed fields for each record type. |
| RECORD_ATTRIBUTES | OBJECT | Variable attributes for each record type. |
| VALUE | VARIANT | Primary event value. |

In some embodiments, the following timestamp columns can be used in an event table:
(a) TIMESTAMP: the time an event was emitted. For generated logs and span events, this is the wallclock time that the event call was made. For spans, which represent the execution time of all or part of a function or procedure, this is the time at which the execution concluded.
(b) START_TIMESTAMP: For spans, the time the span started.

In some embodiments, the TRACE column contains fields trace_id and span_id. The trace_id can be unique for each query and can be the same for all spans within a query. The trace_id can be used for grouping events within a single query execution. The span_id can be unique per query for procedure executions. There may be more than one span_id for a single query, depending on how the query is planned and executed.

In some aspects, values in the RESOURCE_ATTRIBUTES column describe the source of an event in terms of data objects. In some aspects, RESOURCE_ATTRIBUTES are pre-set and cannot be changed.

In some aspects, the part of an event that varies by event type is represented by record columns. The type of the record is recorded in the RECORD_TYPE column and will currently have a value of LOG, SPAN, or SPAN_EVENT.

In some aspects, the fixed fields for each record are recorded in the RECORD column, and each event type can have attributes recorded in the RECORD_ATTRIBUTES column.

In some aspects, log records represent logs generated by user code. The RECORD_TYPE column for logs will have a value of LOG.

In some aspects, the RECORD column for log records is modeled after OpenTelemetry Logs. The column value may contain the following fields listed in Table 23 below.

TABLE 23

| Field | Type | Description |
|---|---|---|
| severity_text | STRING | The text for the log severity. One of TRACE, DEBUG, INFO, WARN, ERROR, FATAL. |

An example log RECORD is {"severity text": "INFO" }.

In some aspects, the RECORD_ATTRIBUTES for log records further describe the individual log event.

For log events, the value of the VALUE column represents the primary argument of the log. For Java and Python, this will be the value passed in the log request. In some aspects, the type of the VALUE column is VARIANT, not STRING, and can have non-string values for some languages (e.g., JavaScript).

In some aspects, spans represent individual executions of functions and procedures. For stored procedures, there can be a single span. For user-defined functions, there may be multiple spans for a single function call, depending on how execution is scheduled.

In some aspects, all spans for a query have the same value for the trace_id field of the TRACE column. In some aspects, the RECORD_TYPE column for spans will have a value of SPAN.

In some aspects, the duration of a span is the difference between the values in the start_timestamp and timestamp columns, indicating the time of the beginning and end of the span execution, respectively. The ID of the span and the query trace can be represented in the value in the TRACE column.

In some aspects, with user configuration, one span can be automatically created for each execution.

In the case of user-defined functions, attributes for spans may be added to indicate the number of rows processed and emitted by the function.

In some aspects, functions provided in the API can be used for each language to add custom attributes to spans.

In some aspects, span events include event records attached to a particular span execution. The RECORD_TYPE column for span events can include a value of SPAN_EVENT. The value of the TRACE column can be used to identify the span in which the event was created.

In some aspects, span events have a single field "name" and can have arbitrary attributes added in the RECORD_ATTRIBUTES column.

Some query examples of using trace events are listed herein below in connection with Tables 24-33.

In some embodiments, trace events can be used for recording the time taken to execute each part of a stored procedure. For example, a user can create a stored procedure that performs several lengthy operations, and the time taken by each operation can be recorded. Subsequently, such information can be aggregated with a SQL query (e.g., compute the average time taken by each operation).

In this case, a user can emit a trace event after each operation and record the duration of that operation in an attribute of the event.

Table 24 below illustrates an example KMeansClusterer class, which can be used to record the runtime of each part of its workflow as well as to record the total runtime of its main function (which is named "run").

TABLE 24

```
class KMeansClusterer {
  public static String run(/* parameters omitted */) {
    long startTime = System.currentTimeMillis( );
    AttributesBuilder attributesBuilder = Attributes.builder( );
    // Creating an instance of KMeansClusterer and calling its methods.
    long endTime = System.currentTimeMillis( );
    attributesBuilder.put(AttributeKey.longKey("runtimeMillis"),
endTime - startTime);
    Telemetry.addEvent("clusteringStats", attributesBuilder.build( ));
  }
    private Row[ ] readInputData( ) {
      long startTime = System.currentTimeMillis( );
      AttributesBuilder attributesBuilder = Attributes.builder( );
      // Reading data from a table and filtering out rows with missing
values.
      attributesBuilder.put(AttributeKey.longKey("runtimeMillis"),
endTime - startTime);
```

TABLE 24-continued

```
    Telemetry.addEvent("readInputData", attributesBuilder.build( ));
  }
    private long computeClusters(Row[ ] rows) {
      long startTime = System.currentTimeMillis( );
      AttributesBuilder attributesBuilder = Attributes.builder( );
      // Computing clusters.
        long endTime = System.currentTimeMillis( );
        attributesBuilder.put(AttributeKey.longKey("runtimeMillis"),
endTime - startTime);
      Telemetry.addEvent("clustering", attributesBuilder.build( ));
    }
}
```

In some embodiments, trace events can be used for recording intermediate results of a computation. For example, a user can create a stored procedure that loads raw data and performs a sequence of transformations. Trace events can be used to record some characteristics of the data after each transformation.

Table 25 below illustrates an example KMeansClusterer class, which can be used to record the following data points:

(a) In its readInputData method, it records the number of rows read from the source and the number of rows with missing values.

(b) In its computeClusters method, it records the number of iterations performed by the clustering algorithm, the limit on the number of iterations, and a Boolean value which indicates whether the algorithm converged before reaching that limit.

TABLE 25

```
class KMeansClusterer {
  private Row[ ] readInputData( ) {
    long startTime = System.currentTimeMillis( );
    AttributesBuilder attributesBuilder = Attributes.builder( );
    DataFrame rawInput = session.table(inputTableName);
    long totalNumRows = rawInput.count( );
    attributesBuilder.put(AttributeKey.longKey("numInputRows"),
totalNumRows);
    // Filtering out rows with missing values.
      attributesBuilder.put(AttributeKey.longKey("numFilteredOutRows"),
numFilteredOutRows);
      attributesBuilder.put(AttributeKey.longKey("runtimeMillis"), endTime -
startTime);
    Telemetry.addEvent("readInputData", attributesBuilder.build( ));
    return result;
  }
  private long computeClusters(Row[ ] rows) {
    long startTime = System.currentTimeMillis( );
    AttributesBuilder attributesBuilder = Attributes.builder( );
    // Computing clusters.
      long endTime = System.currentTimeMillis( );
      attributesBuilder.put(AttributeKey.longKey("runtimeMillis"), endTime - startTime);
      attributesBuilder.put(AttributeKey.longKey("numIterations"), numIterations);
      attributesBuilder.put(AttributeKey.longKey("maxIterations"), maxIterations);
      attributesBuilder.put(AttributeKey.booleanKey("converged"),
(numIterations < maxIterations));
      Telemetry.addEvent("clustering", attributesBuilder.build( ));
    }
}
```

In some embodiments, trace events can be used for recording a summary of a stored procedure execution. At the end of a stored procedure, a user may emit a trace event that contains attributes such as the number of rows processed, time taken to execute the whole procedure, etc.

Table 26 below illustrates an example KMeansClusterer class, which can be used to record the following data points in its main function:

(a) Number of processed rows;

(b) Whether the clustering algorithm ran (it won't run if the input is invalid); and (c) The value returned by the stored procedure to the caller.

TABLE 26

```
class KMeansClusterer {
  public static String run(/* parameters omitted */) {
    long startTime = System.currentTimeMillis( );
    AttributesBuilder attributesBuilder = Attributes.builder( );
    // Reading input
      attributesBuilder.put(AttributeKey.longKey("rowsProcessed"), rows.length);
    // Calling the clustering function
      long endTime = System.currentTimeMillis( );
      attributesBuilder.put(AttributeKey.longKey("runtimeMillis"), endTime -
startTime);
```

In some embodiments, information can be aggregated by querying trace events. Since trace events are structured records, data collected from multiple invocations can be aggregated and used for determining the following information: the average runtime of each part of a code, how many rows have been processed by the code, what is the failure ratio, and how are failed invocations different from successful ones.

Below are several examples of SQL queries that can be run against events emitted by the KMeansClusterer class. All example queries listed below can include setting the name of the event table as follows: set event_table_name='NANVM_OF_YOUR_EVENT_TABLE'.

Example querying of trace events to determine how many times the algorithm did and did not converge is listed in Table 27 below.

TABLE 27

```
select
    record attributes['converged'] as is_converged,
    count(*) as num_invocations
from
    identifier($event_table_name)
where
    resource_attributes['service.name'] like 'KMEANS%'
    and record_type='SPAN_EVENT'
    and record['name'] = 'clustering'
group by is_converged;
```

Example querying of trace events to determine the percentage of invocations where the algorithm was able to converge is listed in Table 28 below.

TABLE 28

```
with tmp1 as (
  select
    case when record_attributes['converged'] = true then 1 else 0
end as one_converged,
    1 as one_invocation
  from
    identifier($event_table_name)
  where
    resource_attributes['service.name'] like 'KMEANS%'
    and record_type='SPAN_EVENT'
    and record['name'] = 'clustering'
),
tmp2 as (
  select
    sum(one_converged) as num_converged,
    sum(one_invocation) as num_invocations
  from
    tmp1
)
select
  num_converged / num_invocations * 100.0 as percent_converged
from tmp2;
```

Example querying of trace events to determine the average limit on the number of iterations when the algorithm did not converge is listed in Table 29 below.

TABLE 29

```
select
    avg(record_attributes['maxIterations']) as average_max_iterations
from
    identifier($event_table_name)
where
    resource_attributes['service.name'] like 'KMEANS%'
    and record_type like 'SPAN%'
    and record['name'] = 'clustering'
    and record_attributes ['converged'] = false;
```

Example querying of trace events to determine the average number of iterations required for convergence is listed in Table 30 below.

TABLE 30

```
select
    avg(record_attributes['numIterations']) as average_iterations
from
    identifier($event_table_name)
where
    resource_attributes['service.name'] like 'KMEANS%'
    and record_type='SPAN_EVENT'
    and record['name'] = 'clustering'
    and record_attributes['converged'] = true;
```

Example querying of trace events to determine the total number of rows processed by the algorithm is listed in Table 31 below.

TABLE 31

```
select
    sum(record_attributes['rowsProcessed']) as total_processed_rows
from
    identifier($event_table_name)
where
    resource_attributes['service.name'] like 'KMEANS%'
    and record_type='SPAN_EVENT'
    and record['name'] = 'clusteringStats';
```

Example querying of trace events to determine the average percentage of filtered out rows is listed in Table 32 below.

TABLE 32

```
select
    avg(record_attributes['numFilteredOutRows'] /
record_attributes['numInputRows'] * 100.0) as avg_per-
cent_of_filtered_out_rows
from
    identifier($event_table_name)
where
    resource_attributes['service.name'] like 'KMEANS%'
    and record_type='SPAN_EVENT'
    and record['name'] = 'readInputData';
```

An example querying of trace events to determine a summary of the top five invocations with the longest total runtime is listed in Table 33 below.

TABLE 33

```
with read_input_data_runtimes as (
    select
        resource_attributes['snow.query.id'] as query_id,
        record_attributes['runtimeMillis'] as read_input_data_run-
        time_millis
    from
        identifier($event_table_name)
    where
        resource_attributes['service.name'] like 'KMEANS%'
        and record_type='SPAN_EVENT'
        and record['name'] = 'readInputData'
),
clustering_runtimes as (
    select
        resource_attributes['snow.query.id'] as query_id,
        record_attributes['runtimeMillis'] as clustering_runtime_millis,
        record_attributes['converged'] as converged,
        record_attributes['numIterations'] as num_iterations,
        record_attributes['maxIterations'] as max_iterations
    from
        identifier($event_table_name)
    where
        resource_attributes['service.name'] like 'KMEANS%'
        and record_type='SPAN_EVENT'
        and record['name'] = 'clustering'
),
total_runtimes as (
    select
        resource_attributes['snow.query.id'] as query_id,
        record_attributes['runtimeMillis'] as total_runtime_millis,
        record_attributes['ranClustering'] as ran_clustering,
        record_attributes['returnValue'] as return_value
    from
        identifier($event_table_name)
    where
        resource_attributes['service.name'] like 'KMEANS%'
        and record_type='SPAN_EVENT'
        and record['name'] = 'clusteringStats'
),
all_runtimes as (
    select
        total_runtimes.query_id as query_id,
        read_input_data_runtime_millis,
        clustering_runtime_millis,
        total_runtime_millis,
        converged,
        num_iterations,
        max_iterations,
        ran_clustering,
        return_value
    from
        read_input_data_runtimes
        inner join clustering_runtimes on read_input_data_runtimes.
query_id = clustering_runtimes.query_id
        inner join total_runtimes on total_runtimes.query_id =
clustering_runtimes.query_id
)
select
    query_id,
    read_input_data_runtime_millis,
    clustering_runtime_millis,
    total_runtime_millis,
    ran_clustering,
    converged,
    num_iterations,
    max_iterations,
    return_value
from
    all_runtimes
order by
    total_runtime_millis desc
limit 5;
```

In some embodiments, the TRACE_LEVEL parameter can be used to provide specific control of the volume of trace events being generated and ingested into the event table (e.g., MET 134). Large volumes of trace events can cause an increase in the cost to ingest event data into the event table. The parameter TRACE_LEVEL can be set anywhere along the account-to-object hierarchy: Account»User»Session or Account»Database»Schema»Object. If the parameter TRACE_LEVEL is set at multiple places, the most verbose level wins.

The example below, listed in Table 34, shows how to set TRACE_LEVEL. When running the function myJSUDF, it will take on a TRACE_LEVEL of ALWAYS as that is more verbose.

TABLE 34

Figure 10:
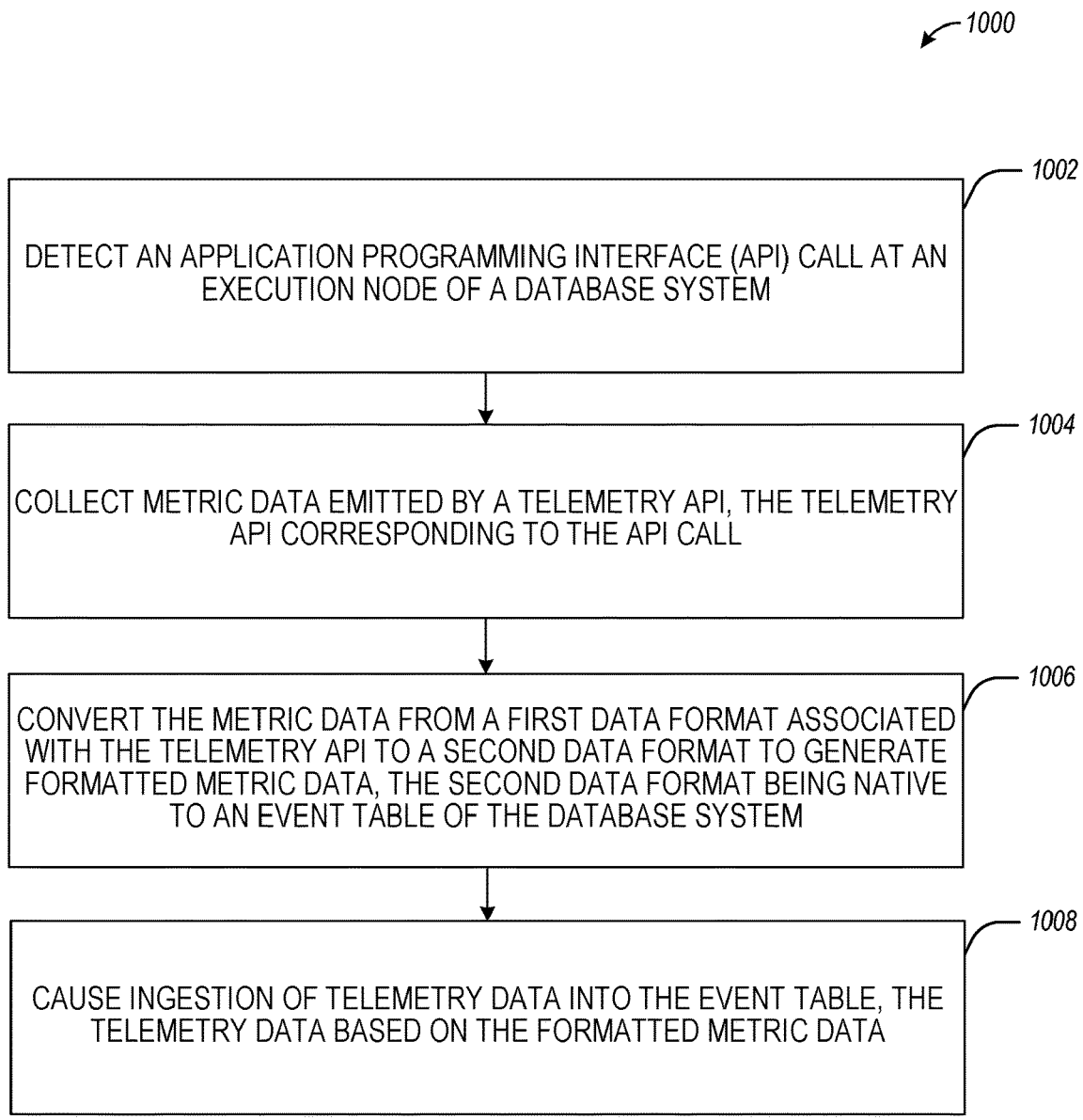
FIG. 10 is a flow diagram illustrating the operations of a database system in performing a method for configuring the generation of trace events, according to some example embodiments.

ALTER SESSION SET TRACE_LEVEL = 'ALWAYS' ;
ALTER FUNCTION myJSUDE SET TRACE_LEVEL = 'ON_EVENT';

FIG. 10 is a flow diagram illustrating the operations of a database system in performing method 1000 for configuring the generation of trace events, according to some example embodiments. Method 1000 may be embodied in computer-readable instructions for execution by one or more hardware components (e.g., one or more processors) such that the operations of method 1000 may be performed by components of the network-based database system 102, such as a network node (e.g., an ET manager 132 executing on a network node of the compute service manager 108) or a computing device (e.g., client device 114) which may be implemented as machine 1100 of FIG. 11 performing the disclosed functions. Accordingly, method 1000 is described below, by way of example with reference thereto. However, it shall be appreciated that method 1000 may be deployed on various other hardware configurations and is not intended to be limited to deployment within the network-based database system 102.

At operation 1002, an application programming interface (API) call is detected at an execution node of a database system. For example, the MET instance 506 may intercept an API call generated by the UDF 504. The API call may be associated with a telemetry API, including metric data.

At operation 1004, metric data emitted by the telemetry API is collected. For example, the MET instance 506 executing within the sandbox process 420 in execution node 302-1 obtains telemetry data 508 (which includes metric data).

At operation 1006, the metric data is converted from a first data format associated with the telemetry API to a second data format to generate formatted metric data. For example, the first data format is an OpenTelemetry (OTEL) JavaScript Object Notation (JSON) format, and the second data format is an event table JSON format (or another data format that is native to MET 134).

At operation 1008, telemetry data based on the formatted metric data is ingested into the event table. For example, and as described in connection with FIG. 5, the data transforming component 513 generates transformed telemetry data 515 (e.g., based on execution of a COPY command), which is ingested into MET 134.

Figure 11:
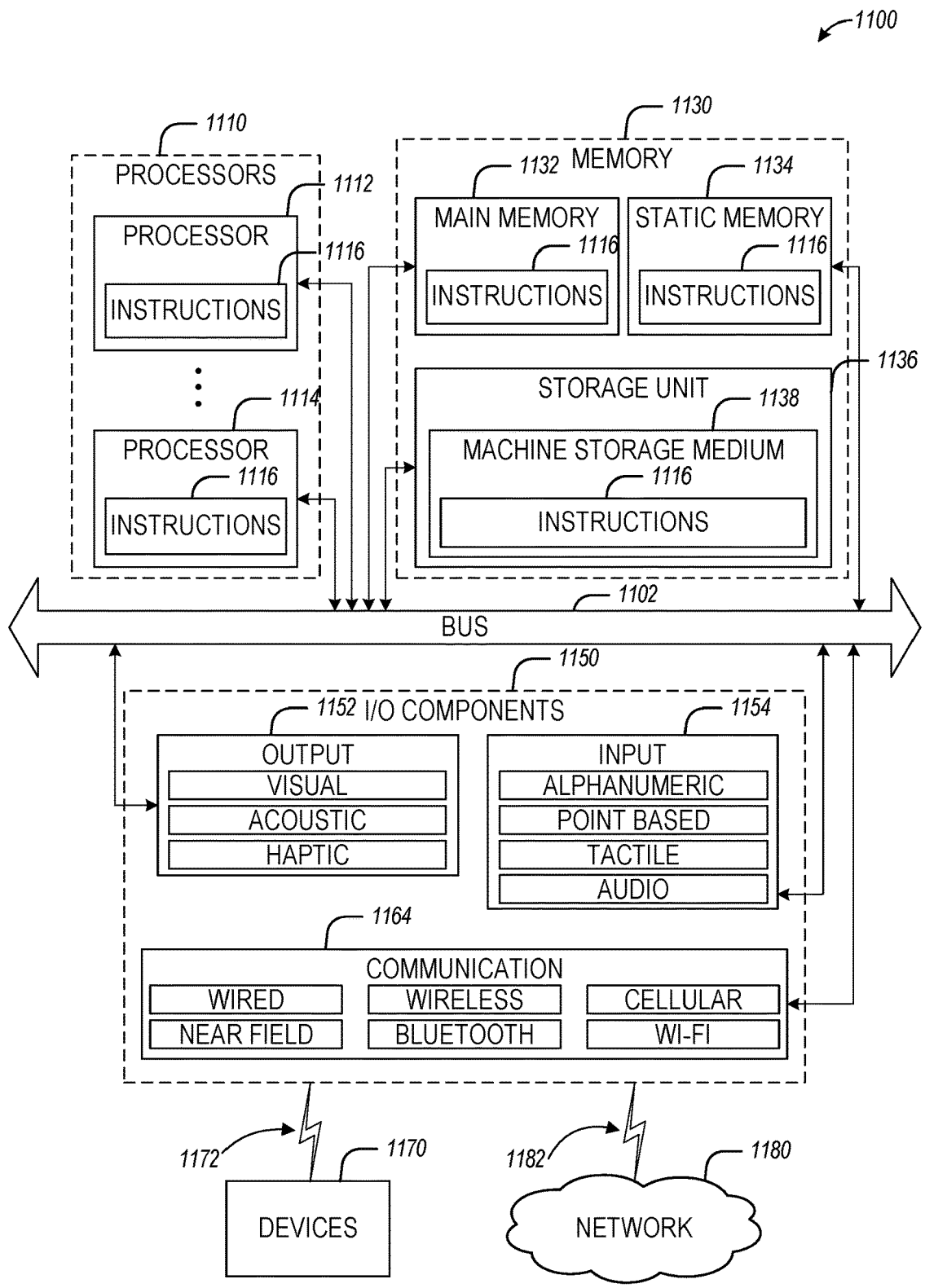
FIG. 11 illustrates a diagrammatic representation of a machine in the form of a computer system within which a set of instructions may be executed to cause the machine to perform any one or more of the methodologies discussed herein, according to some example embodiments.

FIG. 11 illustrates a diagrammatic representation of a machine 1100 in the form of a computer system within which a set of instructions may be executed to cause the machine 1100 to perform any one or more of the methodologies discussed herein, according to an example embodiment. Specifically, FIG. 11 shows a diagrammatic representation of machine 1100 in the example form of a computer system, within which instructions 1116 (e.g., software, a program, an application, an applet, an app, or other executable code) for causing the machine 1100 to perform any one or more of the methodologies discussed herein (e.g., the method 1000) may be executed. For example, instructions 1116 may cause machine 1100 to execute any one or more operations of method 1000 (or any other technique discussed herein, for example, in connection with FIG. 4-FIG. 9). As another example, instructions 1116 may cause machine 1100 to implement one or more portions of the functionalities discussed herein. In this way, instructions 1116 may transform a general, non-programmed machine into a particular machine 1100 (e.g., the client device 114, the compute service manager 108, or a node in the execution platform 110) that is specially configured to carry out any one of the described and illustrated functions in the manner described herein. In yet another embodiment, instructions 1116 may configure the client device 114, the compute service manager 108, and/or a node in the execution platform 110 to carry out any one of the described and illustrated functions in the manner described herein.

In alternative embodiments, the machine 1100 operates as a standalone device or may be coupled (e.g., networked) to other machines. In a networked deployment, machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines that individually or jointly execute instructions 1116 to perform any one or more of the methodologies discussed herein.

Machine 1100 includes processors 1110, memory 1130, and input/output (I/O) components 1150 configured to communicate with each other, such as via a bus 1102. In some example embodiments, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110, such as via the bus 1102. The main memory 1132, the static memory 1134, and the storage unit 1136 store the instructions 1116, embodying any one or more of the methodologies or functions described herein. The instructions 1116 may also reside, completely or partially, within the main memory 1132, within the static memory 1134, within machine storage medium 1138 of the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, communication components 1164 may include a network interface component or another suitable device to interface with network 1180. In further examples, communication components 1164 may include wired communication components, wireless communication components, cellular communication components, and other communication components to provide communication via other modalities. The device 1170 may be another machine or any of a wide variety of peripheral devices (e.g., a peripheral device coupled via a universal serial bus (USB)). For example, as noted above, machine 1100 may correspond to any one of the client device 114, the compute service manager 108, or the execution platform 110, and device 1170 may include the client device 114 or any other computing device described herein as being in communication with the network-based database system 102 or the cloud storage platform 104.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and/or device-storage media include non-volatile memory, including by way of example, semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1180 or a portion of network 1180 may include a wireless or cellular network, and coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of several well-known transfer protocols (e.g., hypertext transfer protocol (HTTP)). Similarly, instructions 1116 may be transmitted or received using a transmission medium via coupling 1172 (e.g., a peer-to-peer coupling or another wired or wireless network coupling) to device 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100 and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the disclosed methods may be performed by one or more processors. The performance of certain operations may be distributed among the one or more processors, not only residing within a single machine but also deployed across several machines. In some embodiments, the processor or processors may be in a single location (e.g., within a home environment, an office environment, or a server farm), while in other embodiments, the processors may be distributed across several locations.

Described implementations of the subject matter can include one or more features, alone or in combination, as illustrated below by way of examples.

Example 1 is a system comprising at least one hardware processor and at least one memory storing instructions that cause the at least one hardware processor to perform operations comprising detecting an application programming interface (API) call at an execution node of a database system, collecting metric data emitted by a telemetry API, the telemetry API corresponding to the API call; converting the metric data from a first data format associated with the telemetry API to a second data format to generate formatted metric data, the second data format being native to an event table of the database system; and causing ingestion of telemetry data into the event table, the telemetry data based on the formatted metric data.

In Example 2, the subject matter of Example 1 includes the operations further comprising executing a COPY command to cause the ingestion of the telemetry data into the event table.

In Example 3, the subject matter of Example 2 includes the operations further comprising: transforming the formatted metric data into the telemetry data during the execution of the COPY command, the transforming based on at least one metric data type of a plurality of metric data types associated with the metric data.

In Example 4, the subject matter of Example 3 includes the operations further comprising: matching during the ingestion, a value type field in the formatted metric data with a corresponding value type column in the event table, wherein the value type field indicates a metric data type associated with the metric data.

In Example 5, the subject matter of Examples 3-4 includes the operations further comprising configuring the transformation of the formatted metric data during the execution of the COPY command using a data manipulation manager in an execution node process of the execution node.

In Example 6, the subject matter of Examples 3-5 includes the operations further comprising detecting the availability of the formatted metric data in a table stage associated with an execution node process of the execution node; and scheduling the ingestion based on the detecting of the availability of the formatted metric data.

In Example 7, the subject matter of Example 6 includes the operations further comprising detecting completion of the scheduling and executing the COPY command based on the detection of the completion of the scheduling.

In Example 8, the subject matter of Examples 1-7 includes subject matter where the first data format is an OpenTelemetry (OTEL) JavaScript Object Notation (JSON) format, and the second data format is an event table JSON format.

In Example 9, the subject matter of Examples 1-8 includes subject matter where the metric data is associated with a metric data type of a plurality of metric data types, and wherein the plurality of metric data types comprises an integer metric data type, a double metric data type; a Boolean metric data type; a string metric data type; a binary metric data type; an array metric data type; an object metric data type; a timestamp metric data type; and a null value metric data type.

In Example 10, the subject matter of Examples 1-9 includes the operations further comprising: instantiating a user code runtime to execute user-defined function (UDF) code, the user code runtime instantiated within a sandbox process of the execution node; and detecting the API call during the execution of the UDF code.

Example 11 is a method comprising: detecting, by at least one hardware processor, an application programming interface (API) call at an execution node of a database system; collecting metric data emitted by a telemetry API, the telemetry API corresponding to the API call; converting the metric data from a first data format associated with the telemetry API to a second data format to generate formatted metric data, the second data format being native to an event table of the database system; and causing ingestion of telemetry data into the event table, the telemetry data based on the formatted metric data.

In Example 12, the subject matter of Example 11 includes executing a COPY command to cause the ingestion of the telemetry data into the event table.

In Example 13, the subject matter of Example 12 includes transforming the formatted metric data into the telemetry data during the execution of the COPY command, the transforming based on at least one metric data type of a plurality of metric data types associated with the metric data.

In Example 14, the subject matter of Example 13 includes matching during the ingestion of a value type field in the formatted metric data with a corresponding value type column in the event table, wherein the value type field indicates a metric data type associated with the metric data.

In Example 15, the subject matter of Examples 13-14 includes configuring the transformation of the formatted metric data during the execution of the COPY command using a data manipulation manager in an execution node process of the execution node.

In Example 16, the subject matter of Examples 13-15 includes detecting the availability of the formatted metric data in a table stage associated with an execution node process of the execution node and scheduling the ingestion based on the detection of the availability of the formatted metric data.

In Example 17, the subject matter of Example 16 includes detecting the completion of the scheduling and executing the COPY command based on the detection of the completion of the scheduling.

In Example 18, the subject matter of Examples 11-17 includes subject matter where the first data format is an OpenTelemetry (OTEL) JavaScript Object Notation (JSON) format, and the second data format is an event table JSON format.

In Example 19, the subject matter of Examples 11-18 includes subject matter where the metric data is associated with a metric data type of a plurality of metric data types, and wherein the plurality of metric data types comprises an integer metric data type, a double metric data type, a Boolean metric data type, a string metric data type, a binary metric data type, an array metric data type, an object metric data type, a timestamp metric data type, and a null value metric data type.

In Example 20, the subject matter of Examples 11-19 includes instantiating a user code runtime to execute user-defined function (UDF) code, the user code runtime instantiated within a sandbox process of the execution node; and detecting the API call during the execution of the UDF code.

Example 21 is a computer-storage medium comprising instructions that, when executed by one or more processors of a machine, configure the machine to perform operations comprising detecting an application programming interface (API) call at an execution node of a database system, collecting metric data emitted by a telemetry API, the telemetry API corresponding to the API call; converting the metric data from a first data format associated with the telemetry API to a second data format to generate formatted metric data, the second data format being native to an event table of the database system; and causing ingestion of telemetry data into the event table, the telemetry data based on the formatted metric data.

In Example 22, the subject matter of Example 21 includes the operations further comprising executing a COPY command to cause the ingestion of the telemetry data into the event table.

In Example 23, the subject matter of Example 22 includes the operations further comprising: transforming the formatted metric data into the telemetry data during the execution of the COPY command, the transforming based on at least one metric data type of a plurality of metric data types associated with the metric data.

In Example 24, the subject matter of Example 23 includes the operations further comprising: matching during the ingestion, a value type field in the formatted metric data with a corresponding value type column in the event table, wherein the value type field indicates a metric data type associated with the metric data.

In Example 25, the subject matter of Examples 23-24 includes the operations further comprising configuring the transformation of the formatted metric data during the execution of the COPY command using a data manipulation manager in an execution node process of the execution node.

In Example 26, the subject matter of Examples 23-25 includes the operations further comprising detecting the availability of the formatted metric data in a table stage associated with an execution node process of the execution node; and scheduling the ingestion based on the detecting of the availability of the formatted metric data.

In Example 27, the subject matter of Example 26 includes the operations further comprising detecting completion of the scheduling and executing the COPY command based on the detection of the completion of the scheduling.

In Example 28, the subject matter of Examples 21-27 includes subject matter where the first data format is an OpenTelemetry (OTEL) JavaScript Object Notation (JSON) format, and the second data format is an event table JSON format.

In Example 29, the subject matter of Examples 21-28 includes subject matter where the metric data is associated with a metric data type of a plurality of metric data types, and wherein the plurality of metric data types comprises an integer metric data type, a double metric data type, a Boolean metric data type, a string metric data type, a binary metric data type, an array metric data type, an object metric data type, a timestamp metric data type, and a null value metric data type.

In Example 30, the subject matter of Examples 21-29 includes the operations further comprising: instantiating a user code runtime to execute user-defined function (UDF) code, the user code runtime instantiated within a sandbox process of the execution node, and detecting the API call during the execution of the UDF code.

Example 31 is at least one machine-readable medium, including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments and other embodiments not explicitly described herein will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   detecting an application programming interface (API) call at an execution node of a database system;
   collecting metric data emitted by a telemetry API, the telemetry API being pre-mapped to the API call within a processing stack of an execution node process configured at the execution node;
   converting the metric data from a first data format associated with the telemetry API to a second data format to generate formatted metric data, the second data format being native to an event table of the database system; and
   causing ingestion of telemetry data into the event table based on an execution of a command during the execution node process, the telemetry data based on the formatted metric data.

2. The system of claim 1, the operations further comprising:
   executing a COPY command to cause the ingestion of the telemetry data into the event table.

3. The system of claim 2, the operations further comprising:
   transforming the formatted metric data into the telemetry data during the executing of the COPY command, the transforming based on at least one metric data type of a plurality of metric data types associated with the metric data.

4. The system of claim 3, the operations further comprising:
   matching during the ingestion, a value type field in the formatted metric data with a corresponding value type column in the event table, wherein the value type field indicates a metric data type associated with the metric data.

5. The system of claim 3, the operations further comprising:
   configuring the transforming of the formatted metric data during the executing of the COPY command using a data manipulation manager in an execution node process of the execution node.

6. The system of claim 3, the operations further comprising:
   detecting availability of the formatted metric data in a table stage associated with an execution node process of the execution node; and
   scheduling the ingestion based on the detecting of the availability of the formatted metric data.

7. The system of claim 6, the operations further comprising:
   detecting a completion of the scheduling; and
   executing the COPY command based on detection of the completion of the scheduling.

8. The system of claim 1, wherein the first data format is an OpenTelemetry (OTEL) JavaScript Object Notation (JSON) format, and the second data format is an event table JSON format.

9. The system of claim 1, wherein the metric data is associated with a metric data type of a plurality of metric data types, and wherein the plurality of metric data types comprises:
  an integer metric data type;
  a double metric data type;
  a Boolean metric data type;
  a string metric data type;
  a binary metric data type;
  an array metric data type;
  an object metric data type;
  a timestamp metric data type; and
  a null value metric data type.

10. The system of claim 1, the operations further comprising:
  instantiating a user code runtime to execute user-defined function (UDF) code, the user code runtime instantiated within a sandbox process of the execution node; and
  detecting the API call during the execution of the UDF code.

11. A method comprising:
  detecting, by at least one hardware processor, an application programming interface (API) call at an execution node of a database system;
  collecting metric data emitted by a telemetry API, the telemetry API being pre-mapped to the API call within a processing stack of an execution node process configured at the execution node;
  converting the metric data from a first data format associated with the telemetry API to a second data format to generate formatted metric data, the second data format being native to an event table of the database system; and
  causing ingestion of telemetry data into the event table based on an execution of a command during the execution node process, the telemetry data based on the formatted metric data.

12. The method of claim 11, further comprising:
  executing a COPY command to cause the ingestion of the telemetry data into the event table.

13. The method of claim 12, further comprising:
  transforming the formatted metric data into the telemetry data during the executing of the COPY command, the transforming based on at least one metric data type of a plurality of metric data types associated with the metric data.

14. The method of claim 13, further comprising:
  matching during the ingestion, a value type field in the formatted metric data with a corresponding value type column in the event table, wherein the value type field indicates a metric data type associated with the metric data.

15. The method of claim 13, further comprising:
  configuring the transforming of the formatted metric data during the executing of the COPY command using a data manipulation manager in an execution node process of the execution node.

16. The method of claim 13, further comprising:
  detecting availability of the formatted metric data in a table stage associated with an execution node process of the execution node; and
  scheduling the ingestion based on the detecting of the availability of the formatted metric data.

17. The method of claim 16, further comprising:
  detecting a completion of the scheduling; and
  executing the COPY command based on detection of the completion of the scheduling.

18. The method of claim 11, wherein the first data format is an OpenTelemetry (OTEL) JavaScript Object Notation (JSON) format, and the second data format is an event table JSON format.

19. The method of claim 11, wherein the metric data is associated with a metric data type of a plurality of metric data types, and wherein the plurality of metric data types comprises:
  an integer metric data type;
  a double metric data type;
  a Boolean metric data type;
  a string metric data type;
  a binary metric data type;
  an array metric data type;
  an object metric data type;
  a timestamp metric data type; and
  a null value metric data type.

20. The method of claim 11, further comprising:
  instantiating a user code runtime to execute user-defined function (UDF) code, the user code runtime instantiated within a sandbox process of the execution node; and
  detecting the API call during the execution of the UDF code.

21. A computer-storage medium comprising instructions that, when executed by one or more processors of a machine, configure the machine to perform operations comprising:
  detecting an application programming interface (API) call at an execution node of a database system;
  collecting metric data emitted by a telemetry API, the telemetry API being pre-mapped to the API call within a processing stack of an execution node process configured at the execution node;
  converting the metric data from a first data format associated with the telemetry API to a second data format to generate formatted metric data, the second data format being native to an event table of the database system; and
  causing ingestion of telemetry data into the event table based on an execution of a command during the execution node process, the telemetry data based on the formatted metric data.

22. The computer-storage medium of claim 21, the operations further comprising:
  executing a COPY command to cause the ingestion of the telemetry data into the event table.

23. The computer-storage medium of claim 22, the operations further comprising:
  transforming the formatted metric data into the telemetry data during the executing of the COPY command, the transforming based on at least one metric data type of a plurality of metric data types associated with the metric data.

24. The computer-storage medium of claim 23, the operations further comprising:
  matching during the ingestion, a value type field in the formatted metric data with a corresponding value type column in the event table, wherein the value type field indicates a metric data type associated with the metric data.

25. The computer-storage medium of claim 23, the operations further comprising:
configuring the transforming of the formatted metric data during the executing of the COPY command using a data manipulation manager in an execution node process of the execution node.

26. The computer-storage medium of claim 23, the operations further comprising:
detecting availability of the formatted metric data in a table stage associated with an execution node process of the execution node; and
scheduling the ingestion based on the detecting of the availability of the formatted metric data.

27. The computer-storage medium of claim 26, the operations further comprising:
detecting a completion of the scheduling; and
executing the COPY command based on detection of the completion of the scheduling.

28. The computer-storage medium of claim 21, wherein the first data format is an Open Telemetry (OTEL) JavaScript Object Notation (JSON) format, and the second data format is an event table JSON format.

29. The computer-storage medium of claim 21, wherein the metric data is associated with a metric data type of a plurality of metric data types, and wherein the plurality of metric data types comprises:
an integer metric data type;
a double metric data type;
a Boolean metric data type;
a string metric data type;
a binary metric data type;
an array metric data type;
an object metric data type;
a timestamp metric data type; and
a null value metric data type.

30. The computer-storage medium of claim 21, the operations further comprising:
instantiating a user code runtime to execute user-defined function (UDF) code, the user code runtime instantiated within a sandbox process of the execution node; and
detecting the API call during the execution of the UDF code.

* * * * *